US011661559B2

(12) United States Patent
Kelfkens et al.

(10) Patent No.: US 11,661,559 B2
(45) Date of Patent: May 30, 2023

(54) UNIVERSAL FEEDER WITH CLAMSHELL TRANSFER SCREW

(71) Applicant: ARIES CLEAN TECHNOLOGIES LLC, Franklin, TN (US)

(72) Inventors: Renus Kelfkens, Franklin, TN (US); Brandon Davis, Franklin, TN (US); Joseph Mikhail, Franklin, TN (US); Matthew Newman, Franklin, TN (US)

(73) Assignee: ARIES CLEAN TECHNOLOGIES LLC, Franklin, TN (US)

( * ) Notice: Subject to any disclaimer, the term of this patent is extended or adjusted under 35 U.S.C. 154(b) by 0 days.

(21) Appl. No.: 17/676,112

(22) Filed: Feb. 18, 2022

(65) Prior Publication Data
US 2022/0169932 A1 Jun. 2, 2022

Related U.S. Application Data

(60) Continuation-in-part of application No. 16/922,824, filed on Jul. 7, 2020, now Pat. No. 11,279,894, which
(Continued)

(51) Int. Cl.
*C10J 3/30* (2006.01)
*C10J 3/46* (2006.01)
(Continued)

(52) U.S. Cl.
CPC ............ *C10J 3/466* (2013.01); *B01J 8/1809* (2013.01); *B01J 8/1827* (2013.01); *C02F 11/10* (2013.01);
(Continued)

(58) Field of Classification Search
CPC ..... C10J 2200/158; C10J 2200/15; C10J 3/30
See application file for complete search history.

(56) References Cited

U.S. PATENT DOCUMENTS 4,968,325 A * 11/1990 Black ................ C10J 3/56
48/77
6,158,571 A * 12/2000 Gosa ................ A01D 61/008
56/364

(Continued)

FOREIGN PATENT DOCUMENTS

CN 206556055 U * 10/2017 ............ F23K 3/00

OTHER PUBLICATIONS

Machine translation of CN-206556055-U (Year: 2017).*

*Primary Examiner* — Imran Akram
(74) *Attorney, Agent, or Firm* — Hollowell Patent Group; Kelly Hollowell

(57) ABSTRACT

Exemplary apparatus or method implementations for a universal feeder system configured with a transfer screw feeder within a multi-section clamshell pipe permitting access to the feed screw and pipe interior for inspection, maintenance and/or cleaning during production, without disassembly or screw removal. The clamshell screw feeder pipe provides access to the screw by opening or removing the multi-section top portion of the clamshell pipe. The top pipe section is bolted and or hinges to the bottom portion of the clamshell pipe. The number of segmented multiple clamshell top sections depends on the length of the screw. One or more clamshell top sections may be configured with an inspection port. The universal feeder system configured with a transfer screw feeder within a multi-section clamshell pipe transfers feedstock feed from one or more feed vessels to one or more reactor vessel.

16 Claims, 17 Drawing Sheets

Related U.S. Application Data is a continuation of application No. 16/801,834, filed on Feb. 26, 2020, now Pat. No. 10,738,249, which is a continuation-in-part of application No. 16/723,538, filed on Dec. 20, 2019, now Pat. No. 10,696,913, which is a continuation-in-part of application No. 16/445,118, filed on Jun. 18, 2019, now Pat. No. 10,611,973, which is a continuation of application No. 15/725,637, filed on Oct. 5, 2017, now abandoned, which is a continuation-in-part of application No. 14/967,973, filed on Dec. 14, 2015, now Pat. No. 9,809,769, which is a division of application No. 13/361,582, filed on Jan. 30, 2012, now Pat. No. 9,242,219.

(51) Int. Cl.
  *B01J 8/18* (2006.01)
  *C10J 3/48* (2006.01)
  *C10K 1/02* (2006.01)
  *C02F 11/10* (2006.01)
  *C10J 3/84* (2006.01)
  *C02F 11/12* (2019.01)
  *C02F 11/121* (2019.01)

(52) U.S. Cl.
  CPC ............ *C10J 3/482* (2013.01); *C10J 3/84* (2013.01); *C10K 1/026* (2013.01); *B01J 2208/00893* (2013.01); *B01J 2208/00902* (2013.01); *C02F 11/12* (2013.01); *C02F 11/121* (2013.01); *C10J 3/30* (2013.01); *C10J 2200/15* (2013.01); *C10J 2200/158* (2013.01); *C10J 2300/0909* (2013.01); *C10J 2300/0916* (2013.01); *C10J 2300/0923* (2013.01); *C10J 2300/0956* (2013.01); *C10J 2300/1643* (2013.01); *C10J 2300/1807* (2013.01); *Y02P 20/129* (2015.11); *Y02W 10/40* (2015.05); *Y10T 29/49* (2015.01)

(56) References Cited

U.S. PATENT DOCUMENTS

| | | | | |
|---|---|---|---|---|
| 6,261,050 | B1 * | 7/2001 | Kuhns | B65G 33/24 |
| | | | | 198/671 |
| 10,024,115 | B1 * | 7/2018 | Bollman | B08B 1/04 |
| 2008/0049543 | A1 * | 2/2008 | Zimmerman | B28B 5/02 |
| | | | | 366/50 |
| 2008/0085172 | A1 * | 4/2008 | Harman | F23K 3/16 |
| | | | | 414/187 |
| 2009/0000195 | A1 * | 1/2009 | Graham | C10J 3/30 |
| | | | | 48/86 R |
| 2009/0130003 | A1 * | 5/2009 | Koch | F23K 3/00 |
| | | | | 422/232 |
| 2011/0114451 | A1 * | 5/2011 | Moreland | B65G 33/32 |
| | | | | 198/657 |
| 2012/0213647 | A1 * | 8/2012 | Koch | C10J 3/30 |
| | | | | 92/165 R |
| 2013/0327258 | A1 * | 12/2013 | Sato | F23G 5/444 |
| | | | | 110/255 |
| 2014/0000496 | A1 * | 1/2014 | Sato | F23G 5/50 |
| | | | | 110/255 |
| 2014/0339346 | A1 * | 11/2014 | Koenig | B02C 21/00 |
| | | | | 241/101.5 |
| 2015/0191386 | A1 * | 7/2015 | Mayrand | C05F 17/929 |
| | | | | 210/297 |
| 2016/0138433 | A1 * | 5/2016 | Janicki | C02F 1/004 |
| | | | | 60/671 |
| 2017/0158975 | A1 * | 6/2017 | Jancok | C10J 3/007 |
| 2022/0260256 | A1 * | 8/2022 | Hamilton | F24B 13/04 |

* cited by examiner

UNIVERSAL FEEDER WITH CLAMSHELL TRANSFER SCREW

CROSS REFERENCE TO RELATED APPLICATIONS

This application is a Continuation-in-part of U.S. application Ser. No. 16/922,824 filed Jul. 7, 2020, which is a Continuation of U.S. application Ser. No. 16/801,834 filed Feb. 26, 2020 (now U.S. Pat. No. 10,738,249 issued Aug. 11, 2020), which is a Continuation-in-part application of U.S. application Ser. No. 16/723,538 filed Dec. 20, 2019 (now U.S. Pat. No. 10,696,913 issued Jun. 30, 2020), which is a Continuation-in-part application of U.S. application Ser. No. 16/445,118 filed Jun. 18, 2019 (now U.S. Pat. No. 10,611,973 issued Apr. 7, 2020), which is a Continuation of U.S. application Ser. No. 15/725,637 filed Oct. 5, 2017, which is a Continuation-in-part of U.S. application Ser. No. 14/967,973 filed Dec. 14, 2015 (now U.S. Pat. No. 9,809,769 issued Nov. 7, 2017), which is a Divisional application of U.S. application Ser. No. 13/361,582 filed Jan. 30, 2012 (now U.S. Pat. No. 9,242,219 issued Jan. 26, 2016), all of which are incorporated herein in their entirety.

FIELD

The present invention relates in general to the field of feedstock disposal including sewage sludge treatment (SST), municipal solid waste (MSW) management, wood waste (WW) processing, refuse derived fuels (RDF) treatment, Automotive Shredder Residue (ASR) and non-recyclable plastics disposal (NRP). Target markets for the present invention include municipalities, landfill operators that clean up and rehabilitate land, waste generators, wastewater treatment facilities, agricultural waste generators, private waste service companies and entrepreneurs invested in renewable energy.

BACKGROUND

Currently the combination of a fluidized bed or bubbling bed gasifier include a feeder system for biosolids that are designed for a single specific feedstock. It is a common practice in the industry that these gasification systems have similar feeder devices but require specialized design features to accommodate specific feedstock related to their respective handling requirements. These are often cumbersome, complex and expensive. What's needed is a standardized device and method of feeding diverse feedstock into the reactor chambers of any gasifier.

SUMMARY

Defined herein are exemplary apparatus embodiments and methods for a universal feeder system configured with a transfer screw feeder within a multi-section clamshell pipe permitting access to the feed screw and pipe interior for inspection, maintenance and/or cleaning during production, without disassembly or screw removal. The clamshell screw feeder pipe provides access to the screw by opening or removing the multi-section top portion of the clamshell pipe. The top pipe section is bolted and or hinges to the bottom portion of the clamshell pipe. The number of segmented multiple clamshell top sections depends on the length of the screw. One or more clamshell top sections may be configured with an inspection port. The universal feeder system configured with a transfer screw feeder within a multi-section clamshell pipe transfers feedstock feed from one or more feed vessels to one or more reactor vessel.

An exemplary implementation may comprise a standardized feeder system designed for a gasifier system to enable different feedstock materials to be fed to existing gasification reactors without having to custom design the feed system or integrate the feeder into the reactor. An exemplary universal feeder system implementation may be combined with a fluidized bed gasification reactor for the treatment of multiple or mixed feedstocks including but not limited to sewage sludge, municipal solid waste, wood waste, refuse derived fuels, automotive shredder residue and non-recyclable plastics, thereby also illustrating a method of gasification for multiple and/or diverse feedstocks using a universal feeder system.

The feeder system consists of one or more feed vessels attached to at least one live bottom dual screw feeder. In one embodiment, the feed vessel is rectangular shaped having three vertical sides and an angled side of no less than 60 degrees from the horizontal to facilitate proper flow of bio-feedstock materials that have different and/or variable flow properties. The vessel also provides for aeration mechanisms such as provided by inserting removable bridge breakers to safeguard flows. The biosolids are transferred from the live bottom dual screw feeder through a chute and into a secondary transfer screw feeder that conveys the material to a feed nozzle operably connected to a gasifier reactor. Various feedstocks may be transferred through the open bottom chute to the live bottom dual screw feeder and through another open bottom chute to the transfer screw feeder that conveys feedstock to the fuel feed inlets of the gasifier. The secondary transfer screw may be equipped with a coolant jacket to maintain a feed temperature between 60° F.-200° F. further expanding the types of feedstock that can be conveyed into a gasifier reactor.

An implementation in accordance with the teaching of the present disclosure may allow for standardizing equipment design and commoditization in the gasification industry by providing a path for simpler gasifier design with fewer equipment components. The universal feeder system may be used in open air, under ambient pressure and low temperature conditions. Where odor control is required, the systems can be fitted with a removable standard containment panel. In the case of biosolids, this design of the system may be a closed system from the feed bin into the gasifier to address odor control. Explosion panels are also optional for explosible dusts.

An implementation in accordance with the teaching of the present disclosure may be used for receiving and conveying bio-feedstock materials into any bioreactor. The feeder system is specifically suitable for categories of waste currently being landfilled, that could be incinerated if permitting new incinerations were possible or that have restricted recycling options to safely and fully dispose of these waste materials. An implementation in accordance with the teaching of the present disclosure may be used by municipalities, landfill operators that clean up and rehabilitate land, waste generators, wastewater treatment facilities, agricultural waste generators, private waste service companies and entrepreneurs invested in renewable energy. Various implementations may also be used in analogous non-gasification processes to convey metered solids to storage tanks, for desegregation in recycling of waste.

Currently there is no prior art of a single universal feeder/gasifier system capable of processing a broad range of feedstocks. Prior art dictates providing for custom designed feedstock-specific feeder systems to handle a specific type of feedstock. This in turn leads to modification and redesign of the gasifier. The present invention solves this problem and in addition, the present design can switch between different bio-feedstocks during operations.

DETAILED DESCRIPTION

Figure 1:
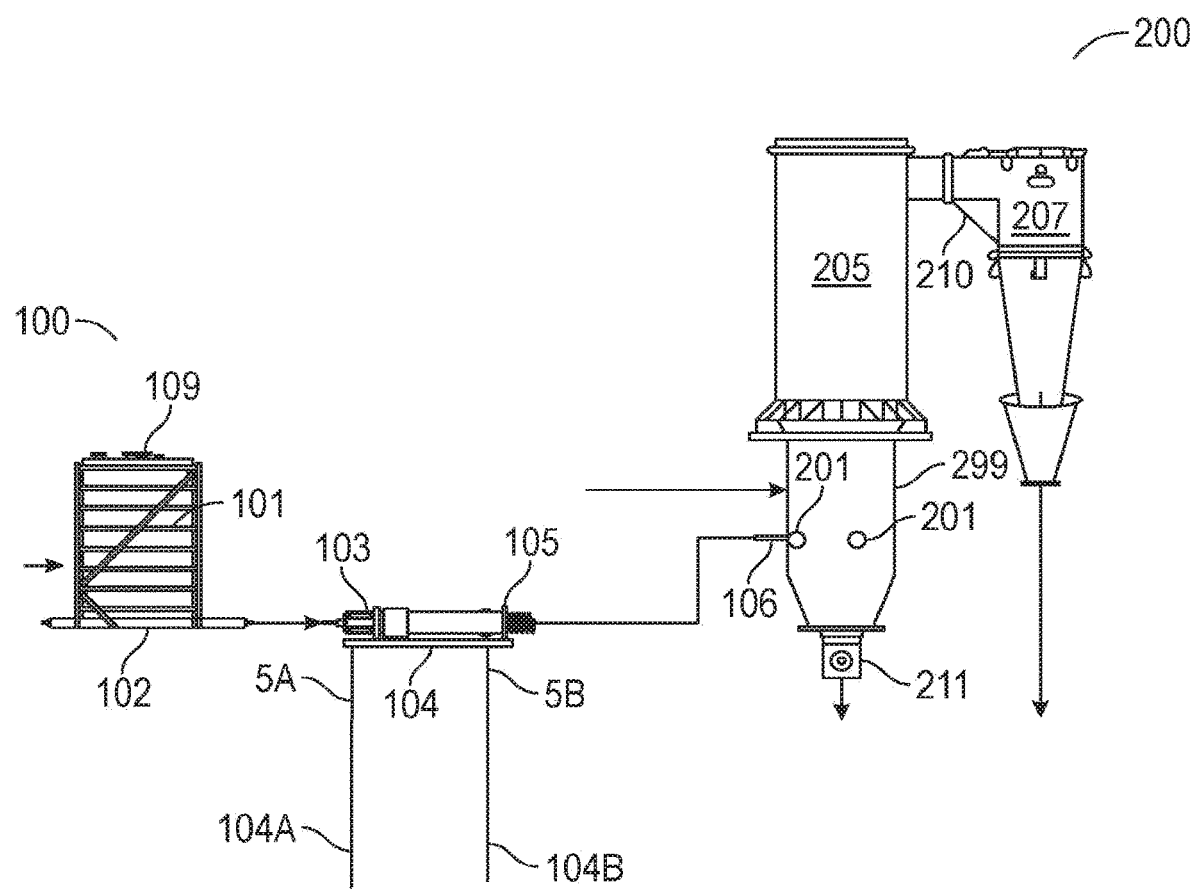
FIG. 1 shows a side view of a gasifier reactor and schematic block diagram illustrating an embodiment of the feeder system configuration for bio-feedstocks.

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention. Reference will now be made in detail to the various exemplary embodiments of the present invention, which are illustrated in the accompanying drawings.

FIG. 1 shows a side view of a gasifier reactor and a schematic diagram illustrating an embodiment of the feeder system 100 configuration for feedstocks which is generally received in a vertically oriented feed vessel 101 meeting industry standard feedstock supply specifications. The system comprises one or more feed vessels 101 each operably connected to a live bottom dual screw feeder 102. In one embodiment, the feed vessel is rectangular shaped having an upper horizontal side with a feed vessel port 109, an open bottom lower horizontal side, four vertical sides comprising a right side, left side front side and back side; wherein at least one of its four vertical sides is angled at least 60 degrees 110 (shown in FIG. 9) from the horizontal to facilitate proper flow of bio-feedstock materials that have different and/or variable flow properties. In one embodiment, the live bottom dual screw feeder 102 is positioned below and parallel to the lower horizontal side of the feed vessel 101 and extends beyond the right and left vertical sides of the feed vessel 101 as shown in FIGS. 1 and 9-11. The vessel also provides for aeration mechanisms such as provided by aeration ports 107 (shown in FIG. 9) and or removable bridge breakers (not shown) that are inserted on the interior of the feed vessel 101 to assist with continuous flow. The live bottom dual screw feeder 102 is conventional industry equipment selected for their ability to transport multiple kinds of feedstock and as such is not limited to sewage sludge, municipal solid waste, wood waste, refuse derived fuels, automotive shredder residue and non-recyclable plastics including blends of two or more biosolids feed stocks such as wood waste plus biosolids.

Figure 9:
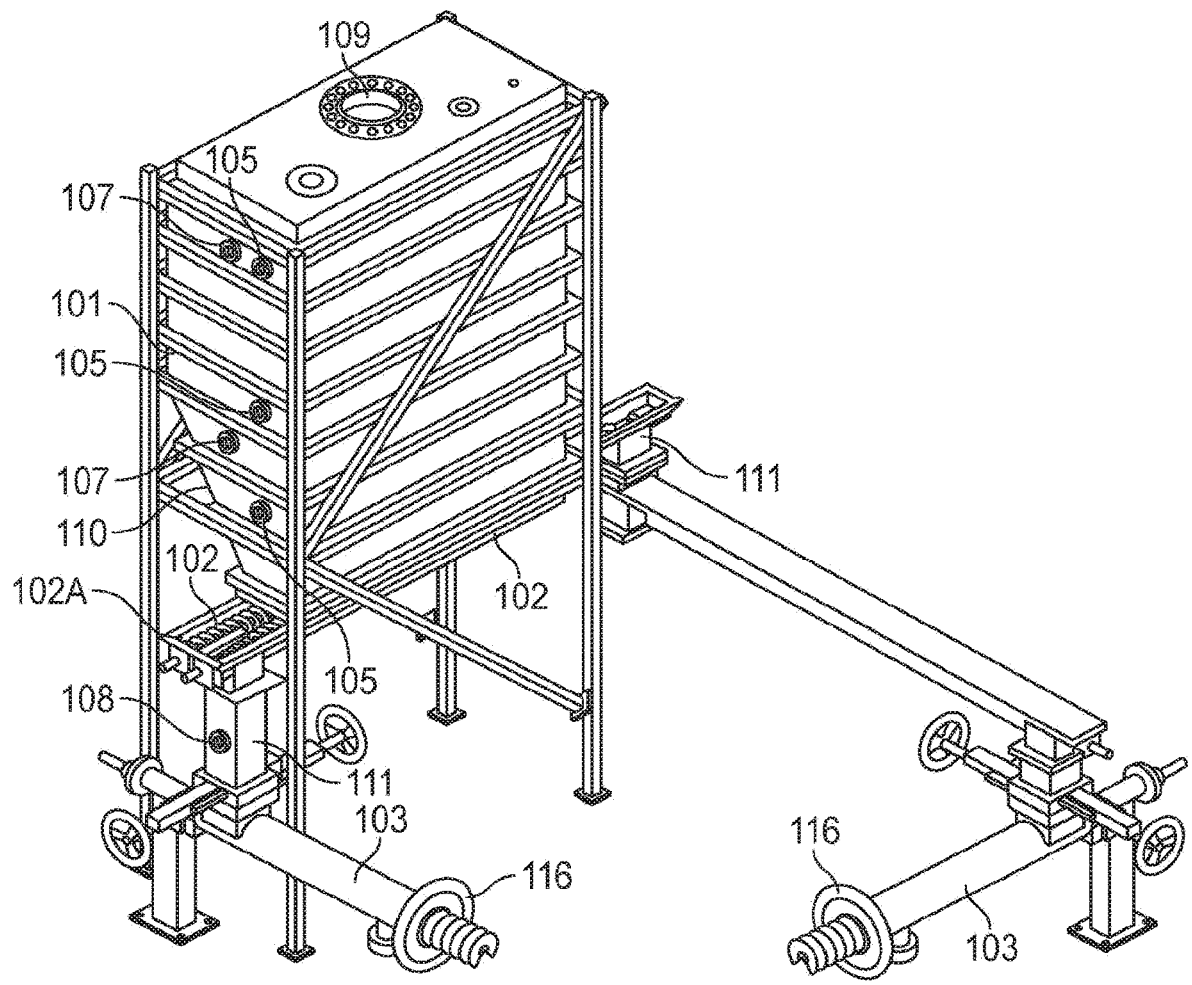
FIG. 9 shows a perspective view of multiple universal gasifier feeder systems connected to a gasifier in accordance with an embodiment of the invention.

Screw feeder 102 also called screw conveyors and are used to control the flow rate of both free and non-free flowing, bulk material from a bin, silo or hopper. Live bottom feeders are specifically designed to convey and meter large quantities of materials in a very efficient manner. During operation the inlet section of the screw trough 102A is designed to be flooded with a selected material. The screw under the inlet can be modified to convey a metered amount of material per revolution of the screw. Modifications include but are not limited to in the flighting diameter, pitch, pipe diameter, trough shape. Screws with uniform diameter and pitch will convey material from the rear of the inlet opening to the front. The drives on screw feeders attached to the rear end, are usually variable speed, so that the discharge from a bin, hopper or feed vessel 101 that falls onto the screw feeder 102 and trough 102A can be adjusted, as required, to stay within a prescribed range. Depending on the number of screws across the bottom of the bin, hopper or feed vessel 101, there may be one drive for all the screws, several drives with the screws driven in-groups or individual drives for each screw. In one embodiment, the dual live bottom screw feeder 102 is configured to convey the material from the feed vessel 101 in two different directions to one of two secondary transfer screw feeders 103 as shown in FIG. 9.

The biosolids are transferred by gravity from the live bottom dual screw feeder 102 through an open bottom chute 111 and onto a secondary transfer screw feeder 103 that conveys the material to a feed nozzle 106 operably connected such as by a flange to flange connection to a fuel feed inlet 201 located on the gasifier reactor vessel 299. In one embodiment, the secondary transfer screw 103 is configured perpendicular to the live bottom dual screw feeder 102 as shown in FIGS. 1 and 9-11. The secondary transfer screw 103 may be equipped with a coolant jacket 104 with a cooling water supply 104A and a cooling water return 104B to maintain a feedstock temperature between 60° F.-200° F. This feature further expands the types of feedstock that can be conveyed into a gasifier reactor. Screw feeders 102 can be substituted with other industry feeders or pressurized pneumatic conveyors. Pressurized pneumatic conveyors would allow the invention to be used in and with a pressurized gasification system and other transfer designs. All screw feeders 102 and transfer screw feeders 103 are variable speed and motor operated. Although it is possible in another embodiment that the screw feed can be manually operated as with a crank.

Figure 10:
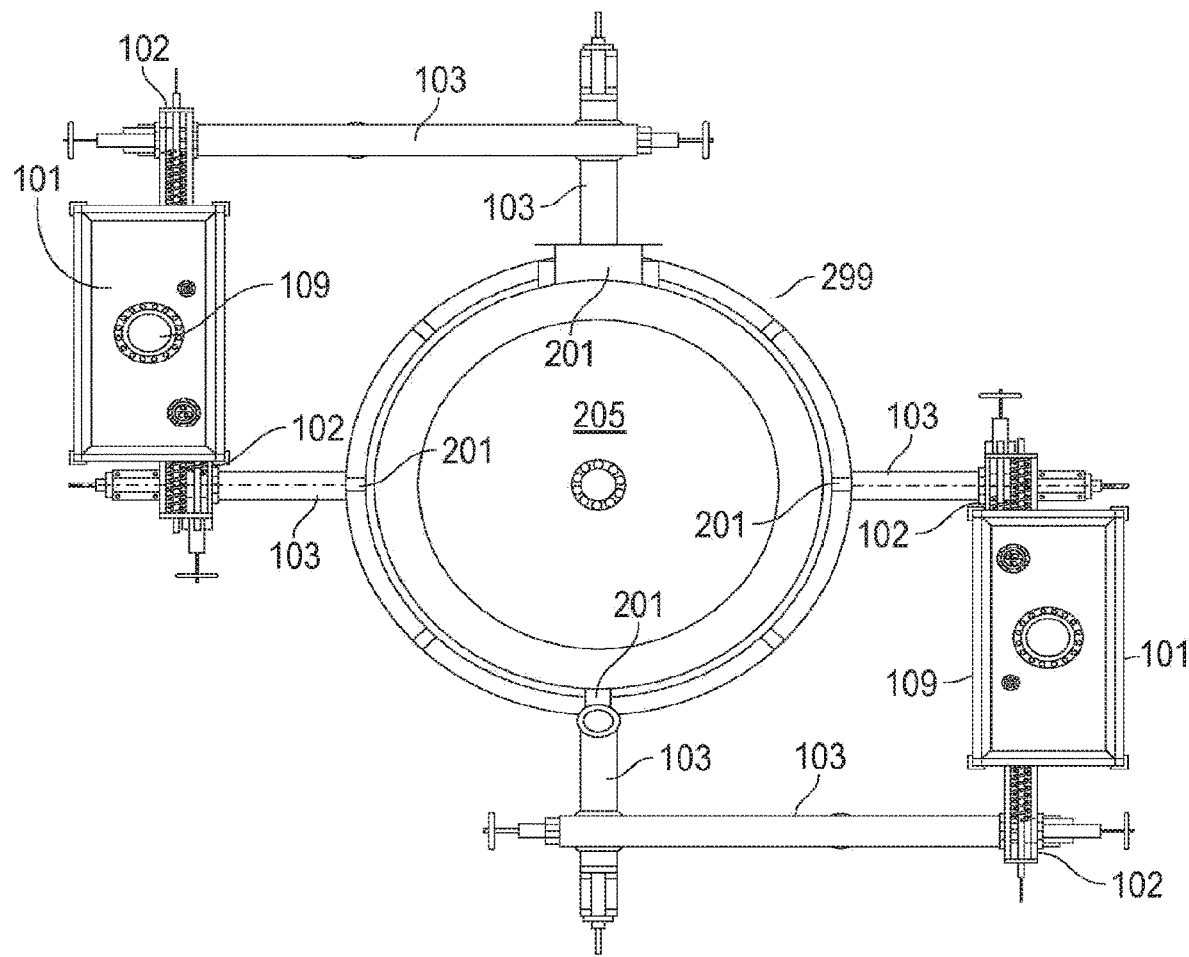
FIG. 10 shows a top view of multiple feeder systems and a single gasifier system with multiple feed points in accordance with an embodiment of the invention.
Figure 11:
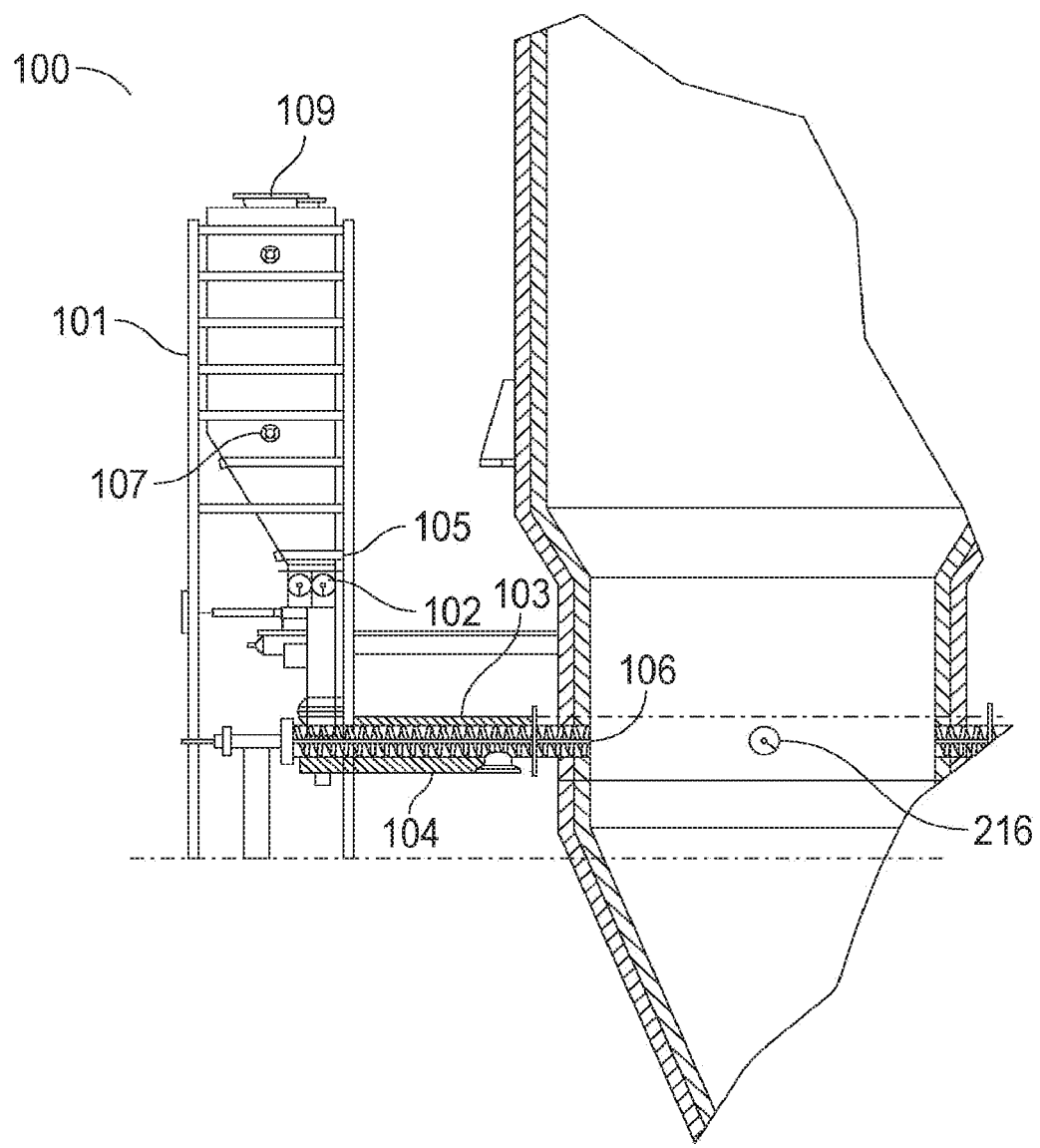
FIG. 11 shows a side view of the universal gasifier feeder system with a cut away view of a gasifier to which the feeder system is attached in accordance with an embodiment of the invention.

In one embodiment, the live bottom dual screw feeder 102 can operate to direct the flow of feedstock in a single direction. In another embodiment, the dual screw feeder 102 can operate to direct flow of feedstock in two different directions. The feedstock can be fed into a gasifier reactor vessel 299 from more than one feed vessel 101 through multiple fuel feed inlets 201 located on the gasifier reactor vessel 299. A live bottom dual screw feeder 102 may therefore feed two separate transfer screw feeders 103; but the transfer screw feeder 103 may also connect and feed another secondary or even tertiary transfer screw feeder 103 as shown in FIGS. 9-11. In one embodiment, the secondary transfer screw 103 is configured perpendicular to the live bottom dual screw feeder 102 and perpendicular to another secondary transfer screw 103 that conveys the material to a feed nozzle 106 operably connected such as by a flange to flange connection to a fuel feed inlet 201 located on the gasifier reactor vessel 299 as shown in FIGS. 9-11. The feed vessel 101 and each screw feeder 102 and 103 connection transfer the biosolids by gravity through an open bottom chute 111 onto the connecting screw feeder until the screw feeder 103 terminates and mechanically connects to the fluidized fuel inlets 201 on the gasifier reactor vessel 299.

The feed vessels 101 may also be sized such that appropriately distributed volumes of feedstock are maintained entering the gasifier through multiple feed ports. The fuel feed inlets 201, also called feed ports, may be placed all around the gasifier vessel reactor 299 to ensure a continuous feed of fuel into the gasifier system 200. The feed vessel 101 inventory may be controlled through load cells or level sensors 105 (shown on FIGS. 9 and 11). Particle size and moisture of the feedstock may be measured upstream of and on route to the feed vessel port 109 to ensure optimum control and performance output of the gasifier system 200.

In one embodiment, the feeder system 100 is capable of receiving and processing multiple feedstocks prepared to a size up to one inch with an optimal range between ⅟₁₆ and ¼ inches. A key requirement of this embodiment is prepping the feedstock to a uniform size, moisture content and quality which is achieved through conventional processes. Prepared feedstock is then introduced into the vessel feed port 109 of the universal feeder vessel 101 and ultimately the gasification reactor vessel 299 for gasification.

Figure 2:
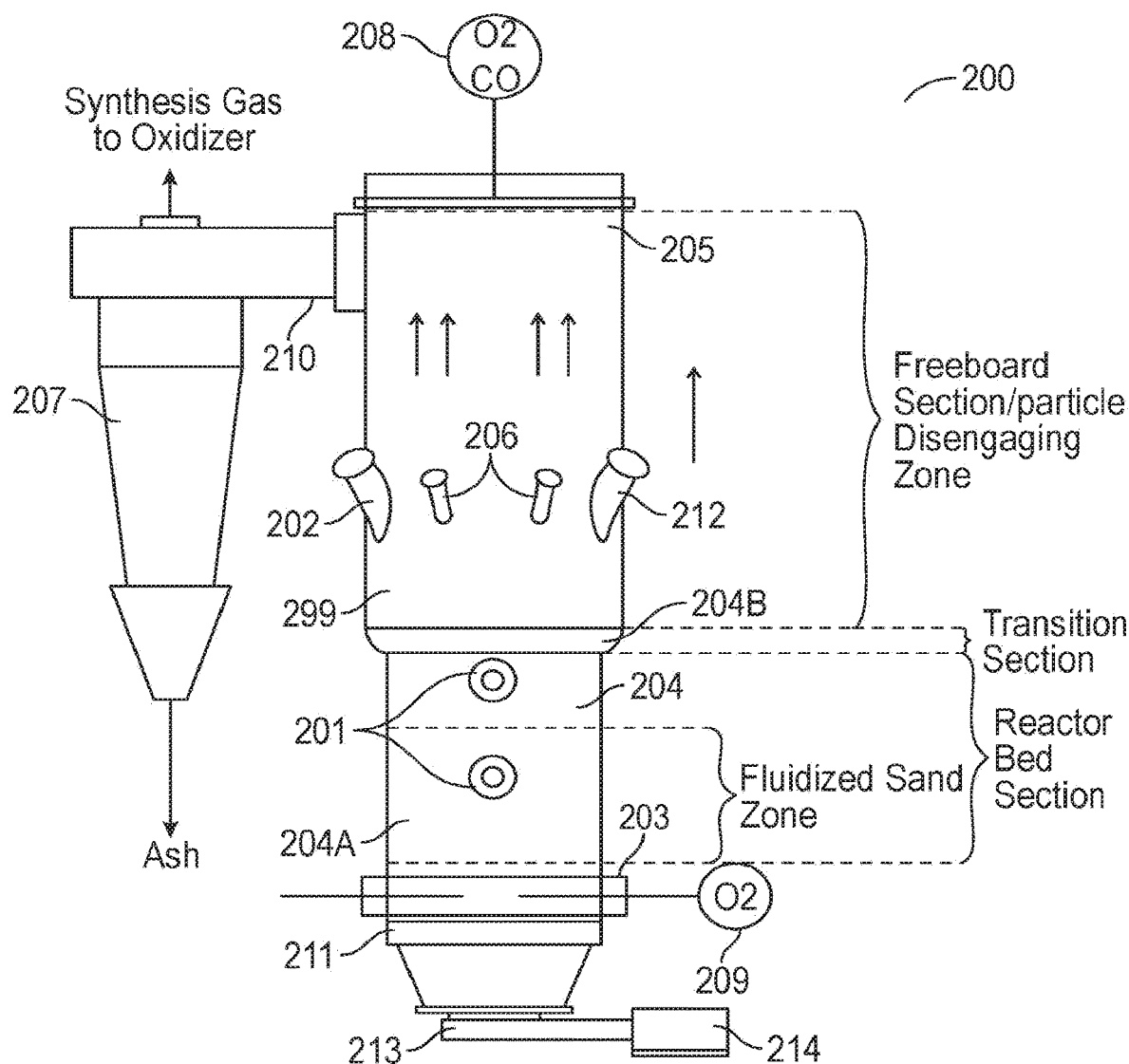
FIG. 2 shows a schematic side view illustrating a fluidized bed gasifier in accordance with an embodiment of the invention.

FIG. 2 shows an embodiment of a bubbling type fluidized bed gasifier 200. In one embodiment, the invention is mechanically connected to a standardized feeder system 100 (shown in FIG. 1) which is designed for a gasifier 200 that enables different feedstock material to be fed into existing gasification reactor vessel 299 without having to custom design a feed system for or integrate a custom feeder system into the gasifier system 200. In one embodiment, the bubbling fluidized bed gasifier 200 will include a reactor 299 operably connected to the feeder system 100 as integral part of a standard gasifier system 200.

In continued reference to FIG. 2, the bubbling fluidized bed gasifier 200 will include a reactor 299 operably connected to a feeder system 100 (shown in FIG. 1) as an extended part of a standard gasifier system 200. In one embodiment, the gasifier 200 includes a reactor vessel 299 having a fluidized media bed 204A, such as but not limited to quartz sand, that is in the base of the reactor vessel and called the reactor bed section 204. In one embodiment, the fluidized sand is a zone that has a temperature of 1150-1600° F. Located above the reactor bed section 204 is a transition section 204B and above the transition section 204B is the freeboard section 205 of the reactor vessel 299. Fluidizing gas consisting of air, flue gas, pure oxygen or steam, or a combination thereof, is introduced into the fluidized bed reactor 299 to create a velocity range inside the freeboard section 205 of the gasifier 200 that is in the range of 0.1 m/s (0.33 ft/s) to 3 m/s (9.84 ft/s). The biosolids are heated inside the fluidized bed reactor to a temperature range between 900° F. and 1700° F. in an oxygen-starved environment having sub-stoichiometric levels of oxygen, e.g., typically oxygen levels of less than 45% of stoichiometric.

Figure 3:
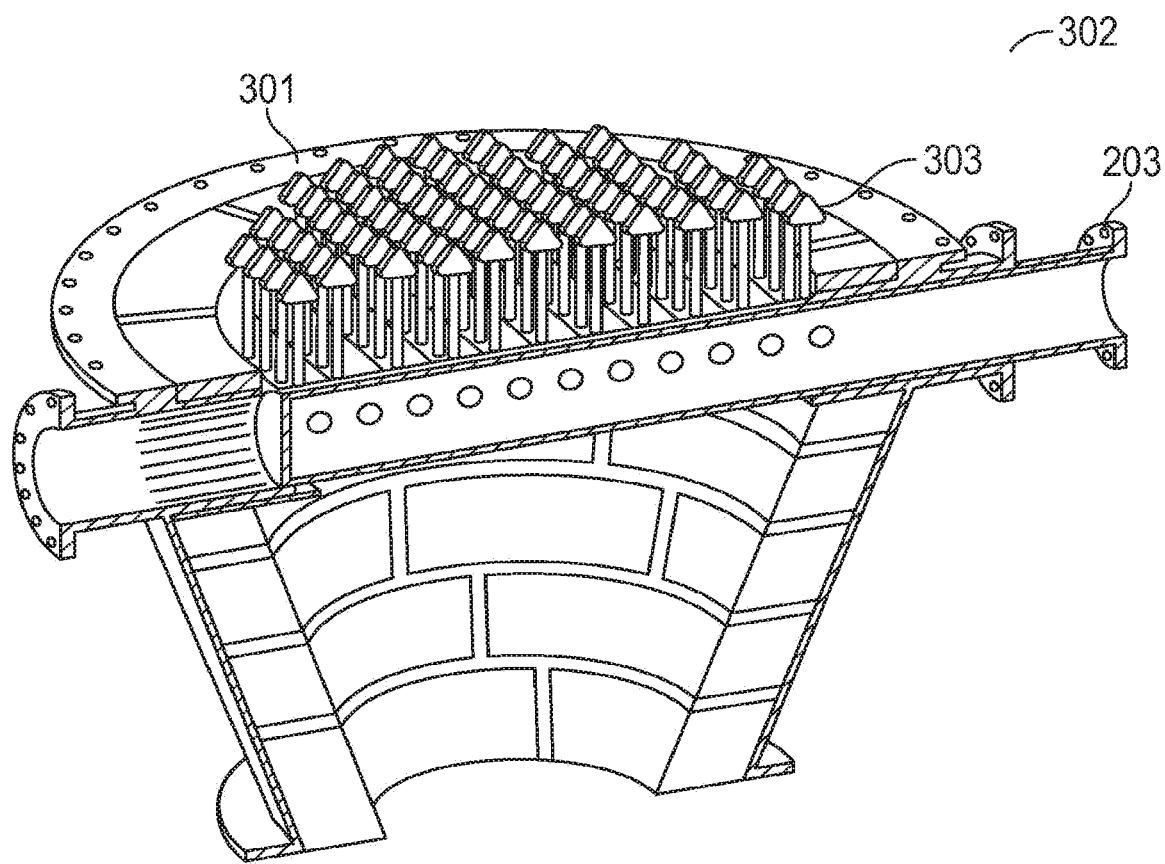
FIG. 3 shows a perspective view illustrating a tuyere type gas distributor of the gasifier in accordance with an embodiment of the invention.
Figure 8A:
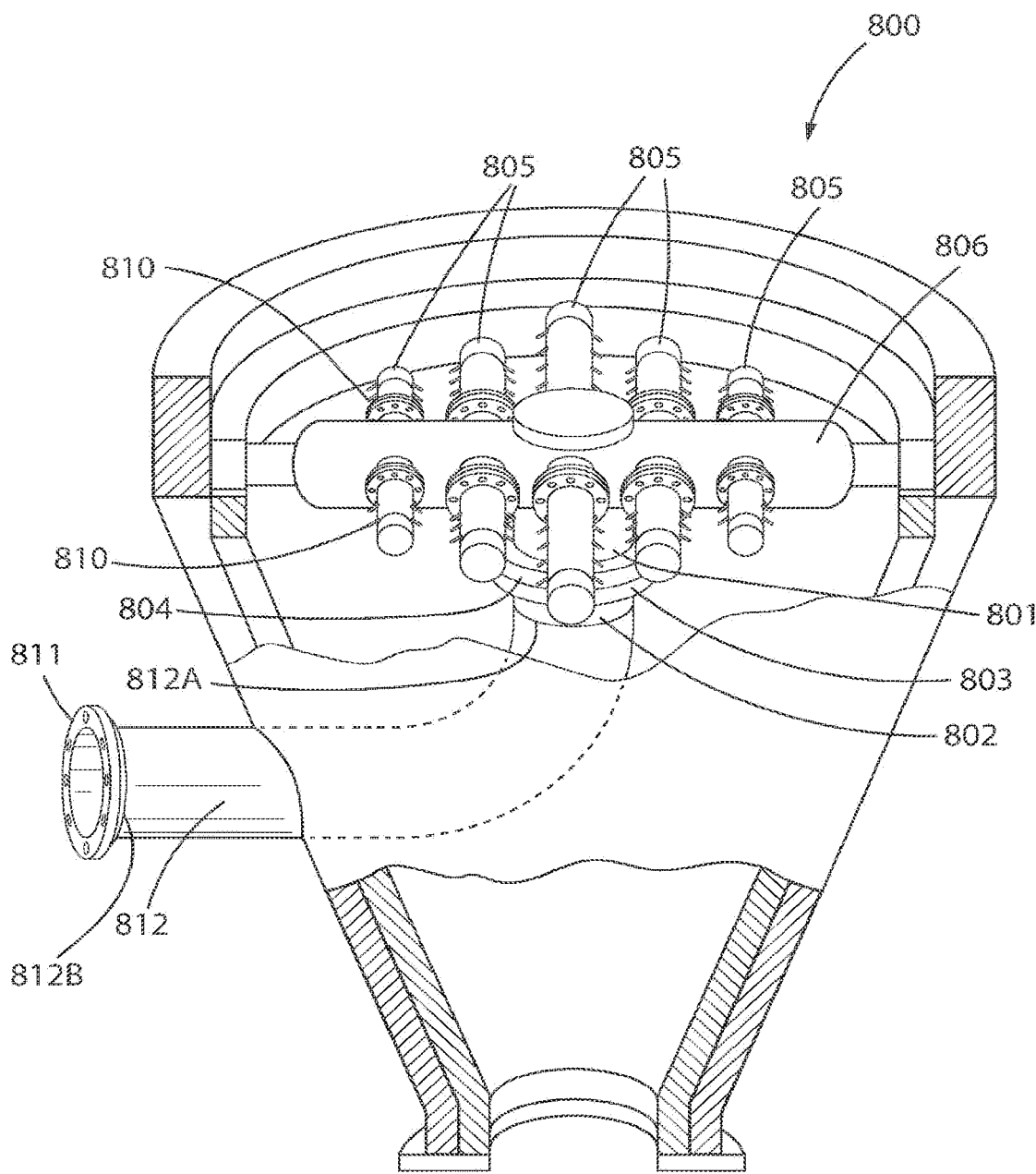
FIG. 8A shows a cut away perspective view illustrating a pipe gas distributor of the gasifier in accordance with an embodiment of the invention.
Figure 8B:
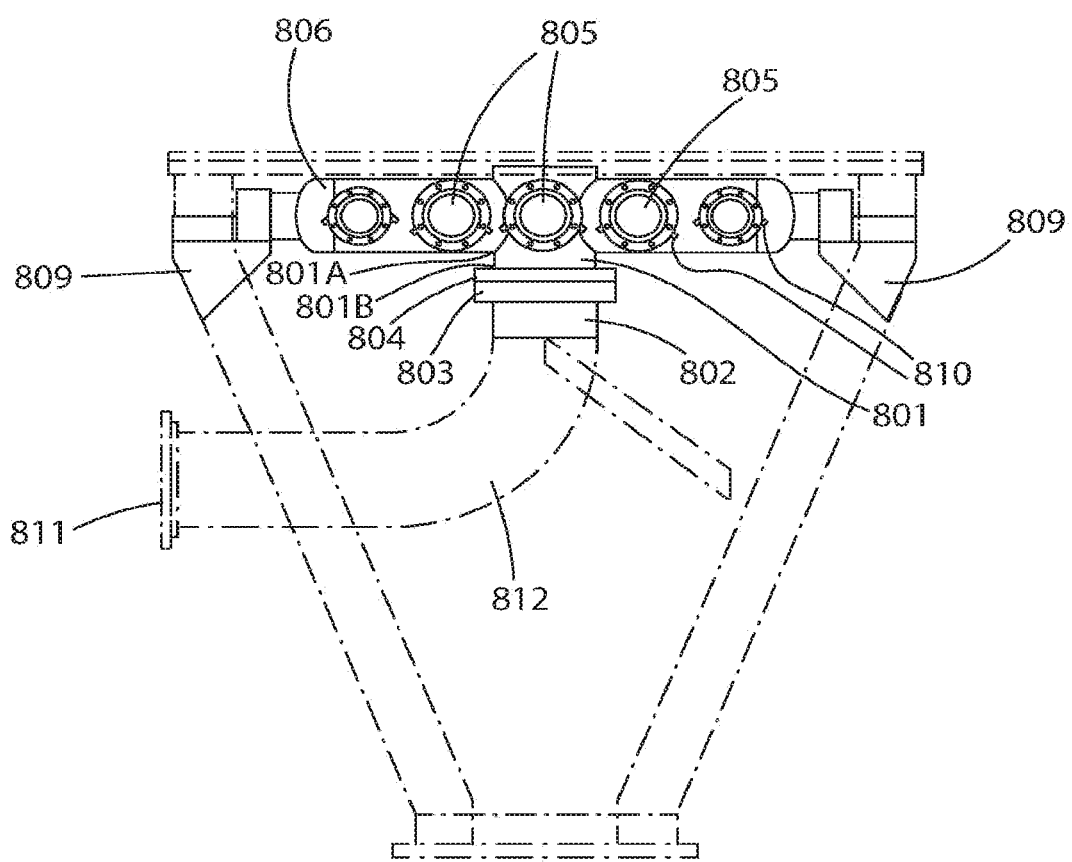
FIG. 8B shows a side elevational view illustrating a pipe gas distributor of the gasifier in accordance with an embodiment of the invention.

The reactor fluidized bed section 204 of a fluidized bubbling bed gasifier 200 is filled with a fluidizing media 204A that may be a sand (e.g., quartz or olivine), or any other suitable fluidizing media known in the industry. Feedstock such as, but not limited to dried biosolids, is supplied to the reactor bed section 204 through fuel feed inlets 201 at 40-250° F. In one embodiment, the feedstock is supplied to the reactor bed section 204 through fuel feed inlets 201 at 215° F.; with the gas inlet 203 in the bubbling bed receiving an oxidant-based fluidization gas such as but not limited to e.g., air. In one embodiment, the air could be enriched air, or a mix of air and recycled flue gas, etc. The air is not pre-heated, it is fed at ambient conditions. The bed is heated up with natural gas and air combustion from a start-up burner and when the bed reaches its ignition temperature for gasification the reactions takes off and is self-sustaining so long as feed carbon and oxygen continue to react. The fluidization gas is fed to the bubbling bed via a gas distributor, such as shown in FIGS. 3 and 8A-B. An oxygen-monitor 209 may be provided in communication with the fluidization gas inlet 203 to monitor oxygen concentration in connection with controlling oxygen levels in the gasification process. An inclined or over-fire natural gas burner (not visible) located on the side of the reactor vessel 299 receives a natural gas and air mixture via a port 202. In one embodiment, the natural gas air mixture is 77° F. which can be used to start up the gasifier and heat the fluidized bed media 204A. When the minimum ignition temperature for self-sustaining of the gasification reactions is reached (~900° F.), the natural gas is shut off. View ports 206 and a media fill port 212 are also provided.

In one embodiment, a freeboard section 205 is provided between the fluidized bed section 204 and the producer gas outlet 210 of the gasifier reactor vessel 299. As the biosolids thermally decompose and transform in the fluidized bed media section (or sand zone) into producer gas and then rise through the reactor vessel 299, the fluidizing medium 204A in the fluidized bed section 204 is disentrained from the producer gas in the freeboard section 205 which is also known as and called a particle disengaging zone. A cyclone separator 207 may be provided to separate material exhausted from the fluidized bed reactor 299 resulting in clean producer gas for recovery with ash exiting the bottom of the cyclone separator 207 alternatively for use or disposal.

An ash grate 211 may be fitted below the gasifier vessel for bottom ash removal. The ash grate 211 may be used as a sifting device to remove any large inert, agglomerated or heavy particles so that the fluidizing media and unreacted char can be reintroduced into the gasifier for continued utilization. In one embodiment, a valve such as but not limited to slide valve 213 which is operated by a mechanism to open the slide valve 214 is located beneath the ash grate 211 to collect the ash. In one embodiment, a second valve 213 and operating mechanism 214 (no shown) are also located below the cyclone separator 207 for the same purpose. That is as a sifting device to remove any large inert, agglomerated or heavy particles so that the fluidizing media and unreacted char can be reintroduced into the gasifier for continued utilization. In one embodiment, the ash grate 211 may be a generic solids removal device known to those of ordinary skill in the art. In another embodiment, the ash grate 211 may be replaced by or combined with the use of an overflow nozzle.

A producer gas control 208 monitors oxygen and carbon monoxide levels in the producer gas and controls the process accordingly. In one embodiment a gasifier feed system 100 feeds the gasifier reactor 299 through the fluidized fuel inlets 201. In one embodiment, the gasifier unit 200 is of the bubbling fluidized bed type with a custom fluidizing gas delivery system and multiple instrument control. The gasifier reactor 299 provides the ability to continuously operate, discharge ash and recycle flue gas for optimum operation. The gasifier reactor 299 can be designed to provide optimum control of feed rate, temperature, reaction rate and conversion of varying feedstock into producer gas.

A number of thermocouple probes (not shown) are placed in the gasifier reactor 299 to monitor the temperature profile throughout the gasifier. Some of the thermal probes are placed in the fluidized bed section 204 of the gasifier rector 299, while others are placed in the freeboard section 205 of the gasifier. The thermal probes placed in the fluidized bed section 204 are used not only to monitor the bed temperature but are also control points that are coupled to the gasifier air system via port 202 in order to maintain a certain temperature profile in the bed of fluidizing media. There are also a number of additional control instruments and sensors that may be placed in the gasifier system 200 to monitor the pressure differential across the bed section 204 and the operating pressure of the gasifier in the freeboard section 205. These additional instruments are used to monitor the conditions within the gasifier as well to as control other ancillary equipment and processes to maintain the desired operating conditions within the gasifier. Examples of such ancillary equipment and processes include but are not limited to the cyclone, thermal oxidizer and recirculating flue gas system and air delivery systems. These control instruments and sensors are well known in the industry and therefore not illustrated.

FIG. 3 shows a perspective cut away side view illustrating a gas distributor 302 of the gasifier in accordance with an embodiment of the invention. A flue gas and air inlet 203 feeds flue gas and air to an array of nozzles 301. Each of the nozzles includes downwardly directed ports inside cap 303 such that gas exiting the nozzle is initially directed downward before being forced upward into the fluidized bed in the reactor bed section 204 (shown in FIG. 2). An optional ash grate 211 under the gasifier may be used as a sifting device to remove any agglomerated particles so that the fluidizing media and unreacted char can be reintroduced into the gasifier for continued utilization. Also shown is a cut away view of the gas inlet 203 in the bubbling bed receiving an oxidant-based fluidization gas such as but not limited to e.g., air.

Biogasifier Reactor Sizing

The following provides a non-limiting example illustrating computation of the best dimensions for a bubbling fluidized bed gasification reactor in accordance with an embodiment of the invention. The gasifier, in this example, is sized to accommodate two specific operating conditions: The current maximum dried biosolids output generated from the dryer with respect to the average solids content of the dewatered sludge supplied to the dryer from the existing dewatering unit; and the future maximum dried biosolids feed rate that the dryer will have to deliver to the gasifier if the overall biosolids processing system has to operate without consumption of external energy, e.g., natural gas, during steady state operation with 25% solids content dewatered sludge being dried and 5400 lb/hr of water being evaporated from the sludge.

The first operating condition corresponds to the maximum output of dried sewage sludge from the dryer if, e.g., 16% solids content sludge is entering the dryer, and 5400 lb/hr of water is evaporating off the sludge. This corresponds to a biosolids feed rate in the small-scale gasifier of 1,168 lbs/hr of thermally dried biosolids at 10% moisture content entering the gasifier. In one embodiment, a solids content of 16-18% represents the estimated extent of dewatering that is required to make the drying load equal to the amount of thermal energy which can be recovered from the flue gas and used to operate the dryer. If sludge below 16% solids content are processed in the dryer, an external heat source can supplement the drying process. The second operating condition corresponds to the maximum amount of dried biosolids (dried to 10% moisture content) that the drier can produce if 25% solids content dewatered biosolids is fed into the drier. The second condition corresponds to the gasifier needing to process 2,000 lb/hr of 10% moisture content biosolids. In other words, there will be excess heat from feeding biosolids to the gasifier if greater than 20% content of biosolids in the sludge is used.

Figure 4:
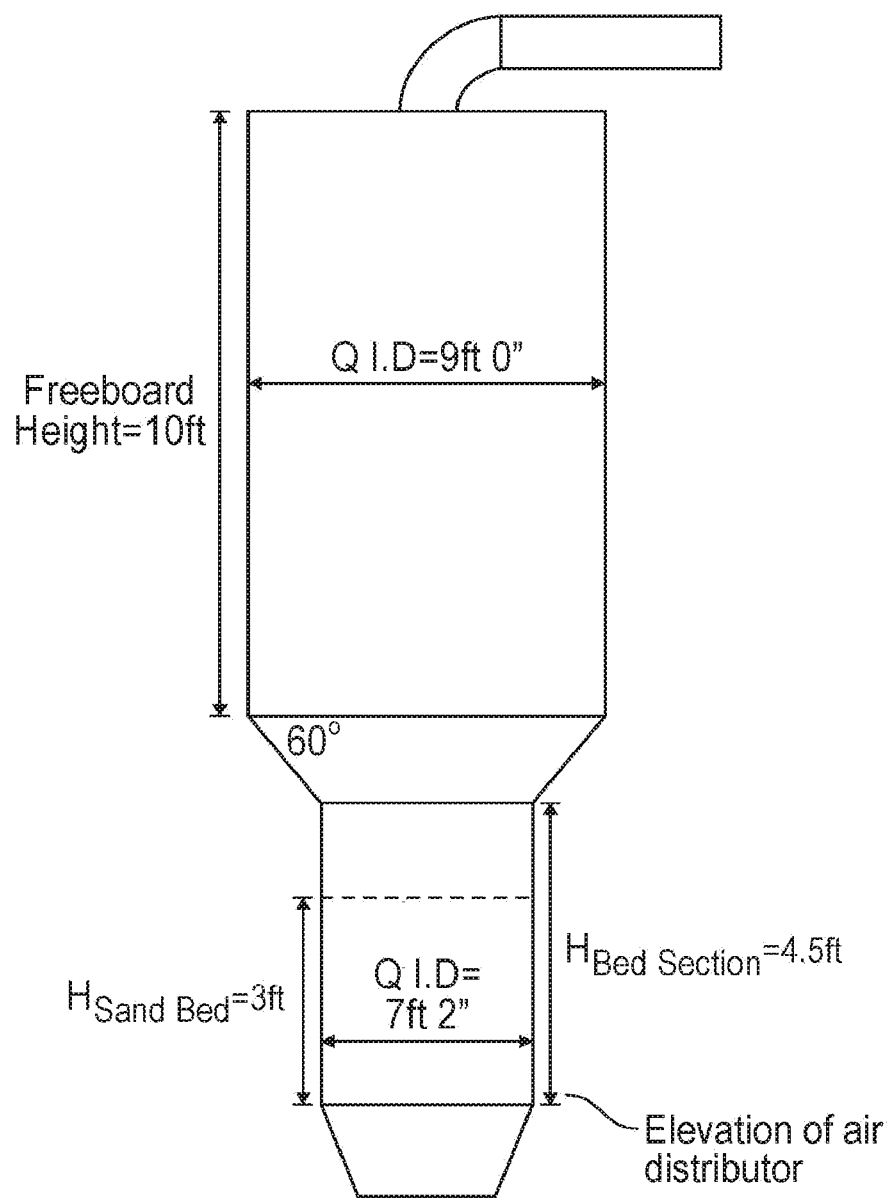
FIG. 4 shows a schematic side view illustrating a mid-size non-limiting example of a gasifier's internal dimensions in accordance with an embodiment of the invention.

FIG. 4 shows a non-limiting example of the gasifier with a reactor freeboard diameter of 9 feet, 0 inches and other internal dimensions in accordance with the invention. The dimensions shown satisfy the operational conditions that are outlined in previous applications. As is known in the art, one factor in determining gasifier sizing is the bed section internal diameter. The role of the bed section of the reactor is to contain the fluidized media bed. The driving factor for selecting the internal diameter of the bed section of the gasifier is the superficial velocity range of gases, which varies with different reactor internal diameters. The internal diameter has to be small enough to ensure that the media bed is able to be fluidized adequately for the given air, recirculated flue gas and fuel feed rates at different operating temperatures, but not so small as to create such high velocities that a slugging regime occurs and media is projected up the freeboard section. The media particle size can be adjusted during commissioning to fine tune the fluidizing behavior of the bed. In the present, non-limiting example, an average media (sand) particle size of about 700 μm was selected due to its ability to be fluidized readily, but also its difficulty to entrain out of the reactor. The most difficult time to fluidize the bed is on start up when the bed media and incoming gases are cold. This minimum flow rate requirement is represented by the minimum fluidization velocity, ("$U_{mf}$") values displayed in the previous table.

Another factor in determining gasifier sizing is the freeboard section internal diameter. The freeboard region of the gasifier allows for particles to drop out under the force of gravity. The diameter of the freeboard is selected with respect to the superficial velocity of the gas mixture that is created from different operating temperatures and fuel feed rates. The gas superficial velocity must be great enough to entrain the small ash particles, but not so great that the media particles are entrained in the gas stream. The extent of fresh fuel entrainment should also be minimized from correct freeboard section sizing. This is a phenomenon to carefully consider in the case of biosolids gasification where the fuel typically has a very fine particle size. Introducing the fuel into the side of the fluidized bed below the fluidizing media's surface is one method to minimize fresh fuel entrainment. This is based on the principle that the fuel has to migrate up to the bed's surface before it can be entrained out of the gasifier, and this provides time for the gasification reactions to occur.

Figure 5:
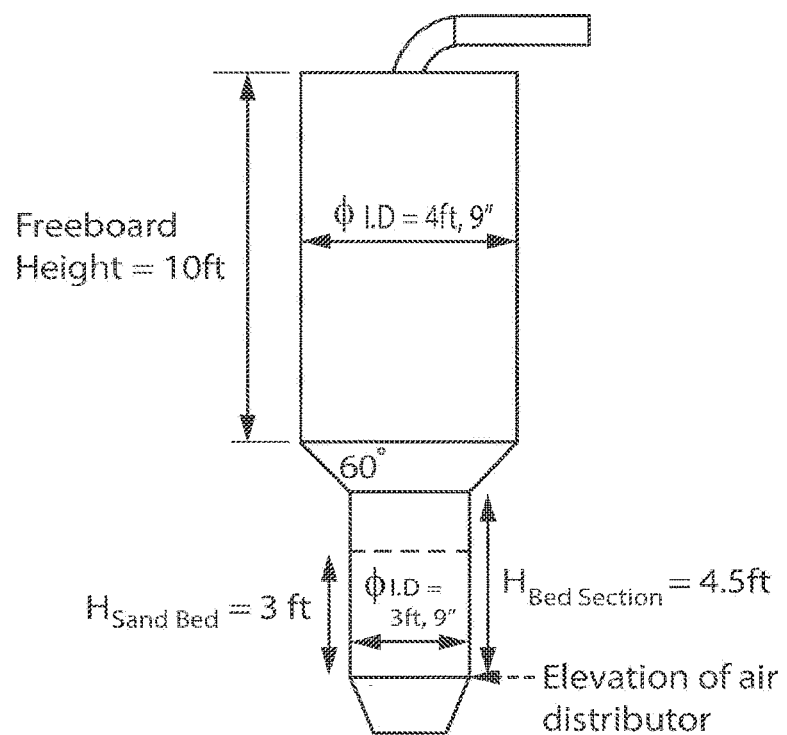
FIG. 5 shows a schematic side view illustrating a smaller non-limiting example of a gasifier's internal dimensions in accordance with an embodiment of the invention.

In one non-limiting example shown in FIG. 5, a reactor with freeboard diameter of 4 feet, 9 inches is chosen for smaller volumes of feed of about 24 tons per day but also to maintain gas superficial velocities high enough to entrain out ash but prevent entrainment of sand (or other fluidizing media) particles in the bed.

A further factor in determining gasifier sizing is the media bed depth and bed section height. In general, the higher the ratio of media to fuel in the bed, the more isothermic the bed temperatures are likely to be. Typically, fluidized beds have a fuel-to-media mass ratio of about 1-3%. The amount of electrical energy consumed to fluidize the media bed typically imparts a practical limit on the desirable depth of the media. Deeper beds have a higher gas pressure drop across them and more energy is consumed by the blower to overcome this resistance to gas flow. A fluidizing media depth of 3 feet is chosen in this example shown in FIG. 5, which is based on balancing the blower energy consumption against having enough media in the bed to maintain isothermal temperature and good heat transfer rates. The height of the bed section of the reactor in this non-limiting example is based on a common length-to-diameter aspect ratio of 1.5, relative to the depth of the fluidizing media.

Another factor in determining gasifier sizing is the height of the freeboard section 205. The freeboard section 205 is designed to drop out particles and return it to the bed, under the force of gravity and a reduction of superficial velocity as a result of the larger diameter in the free board section. As one moves up in elevation from the bed's surface, the particle size and density decreases, until at a certain elevation, a level known as the Transport Disengaging Height (TDH) is reached. Above the TDH, the particle density entrained up the reactor is constant. Extending the reactor above the TDH adds no further benefit to particle removal. For practical purposes 10 feet is selected for the height of the freeboard section 205 in this non-limiting example shown in FIG. 5. While the invention has been particularly shown and described with reference to a preferred embodiment in FIG. 5, it will be understood by those skilled in the art that various changes in form and details may be made therein without departing from the spirit and scope of the invention.

Figure 6:
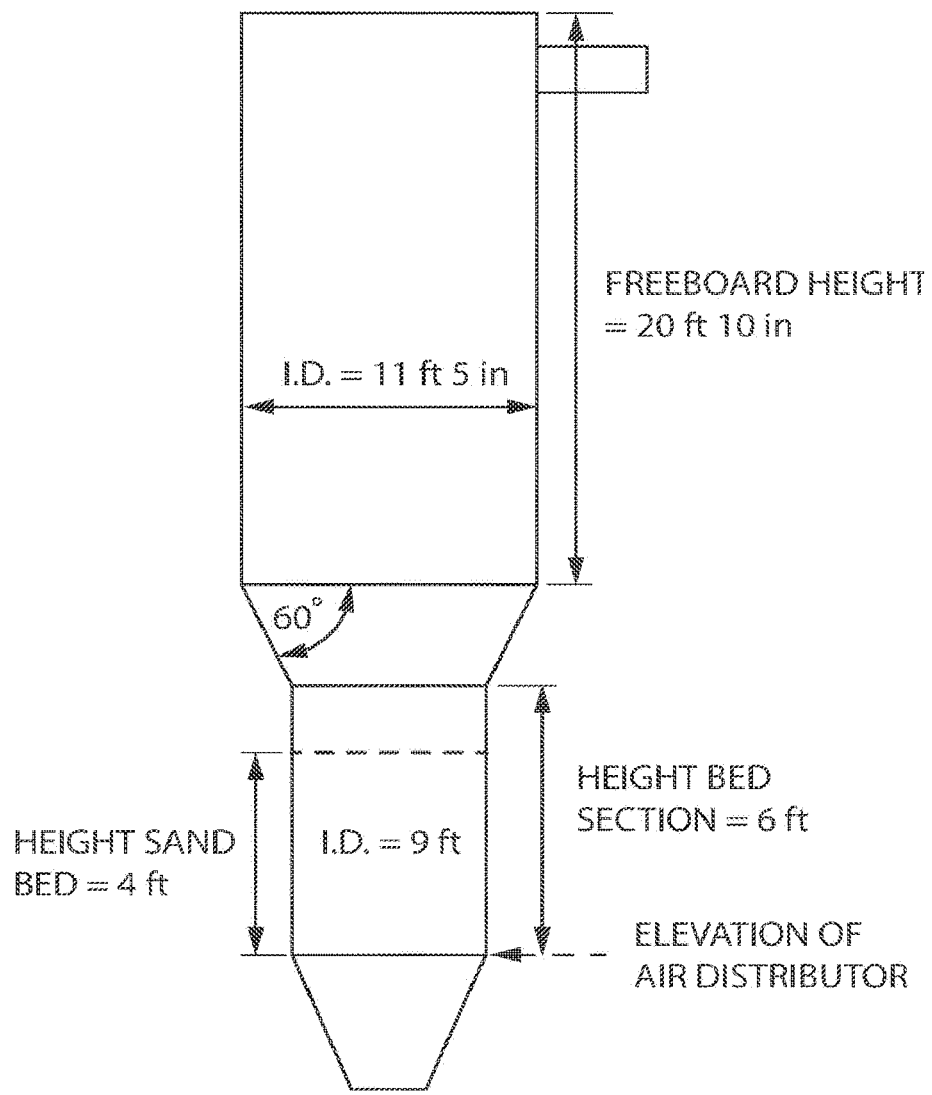
FIG. 6 shows a schematic side view illustrating a larger non-limiting example of a gasifier's internal dimensions in accordance with an embodiment of the invention.

FIG. 6 shows a schematic side view illustrating a larger scaled-up embodiment is provided in which the gasifier internal dimensions are enlarged in accordance with the invention. In this embodiment, the invention illustrates a scaling up or enlargement of the gasifier reactor vessel. In one embodiment, the increase in reactor vessel size has a capacity scale that is at least 4 times larger in processing feedstock volume than the small-scale reactor vessel shown in FIG. 5. For example, the small-scale reactor can process 24 tons per day of feedstock. The large-scale reactor can process more than 40 tons per day with an average of about 100 tons per day of feedstock. At an average of 100 tons per day of feedstock equals an average of at least 4 times that of the small-scale reactor of 24 tons per day which is equal to about 96 tons per day. In one, embodiment, of the scaled-up large format reactor, the multi-tuyere gas distributor shown in FIG. 3 is replaced with a conventional pipe-based fluidization gas distribution system shown in FIGS. 8A-8B. The substitution of the pipe-based distributor 800 simplifies and eliminates the complexity, time and cost associated with the mechanical fabrication of scaling up the multi-tuyere gas distributor design used in the bioreactor unit illustrated in FIG. 3. A conventional pipe-based fluidization gas distribution system allows a single large vessel reactor capable of processing at least 4 times the quantity of feedstock processed in a small-scale reactor. The larger scale reactor illustrated in FIGS. 6-7 has many of the same features as the smaller scaled version illustrated in FIGS. 2 and 5. However, some adjustments to the reactor bed and freeboard height are required based on the change in diameter of the reactor bed section. The formula for Transport Disengaging Height ("TDH") is a function of the change in diameter of the reactor bed section 704 shown in FIG. 7. Specifically, the geometric ratios remain the same to minimize/eliminate performance scale-up risk.

FIG. 6 also shows a non-limiting example illustrating computation of the sample dimensions for sizing the gasifier reactor when it is a bubbling fluidized bed gasification reactor. More specifically, FIG. 6 shows a non-limiting example of the gasifier with a reactor freeboard diameter of 11 feet, 5 inches and other internal dimensions in accordance with the invention. The gasifier, in this example, is sized to accommodate specific design operating conditions for dried biosolids feed rate delivered to the gasifier corresponding to a biosolids feed rate in the large-scale gasifier of 8,333 lb/hr and 7040 lb/hr of thermally dried biosolids at 10% moisture content entering the gasifier.

Figure 7:
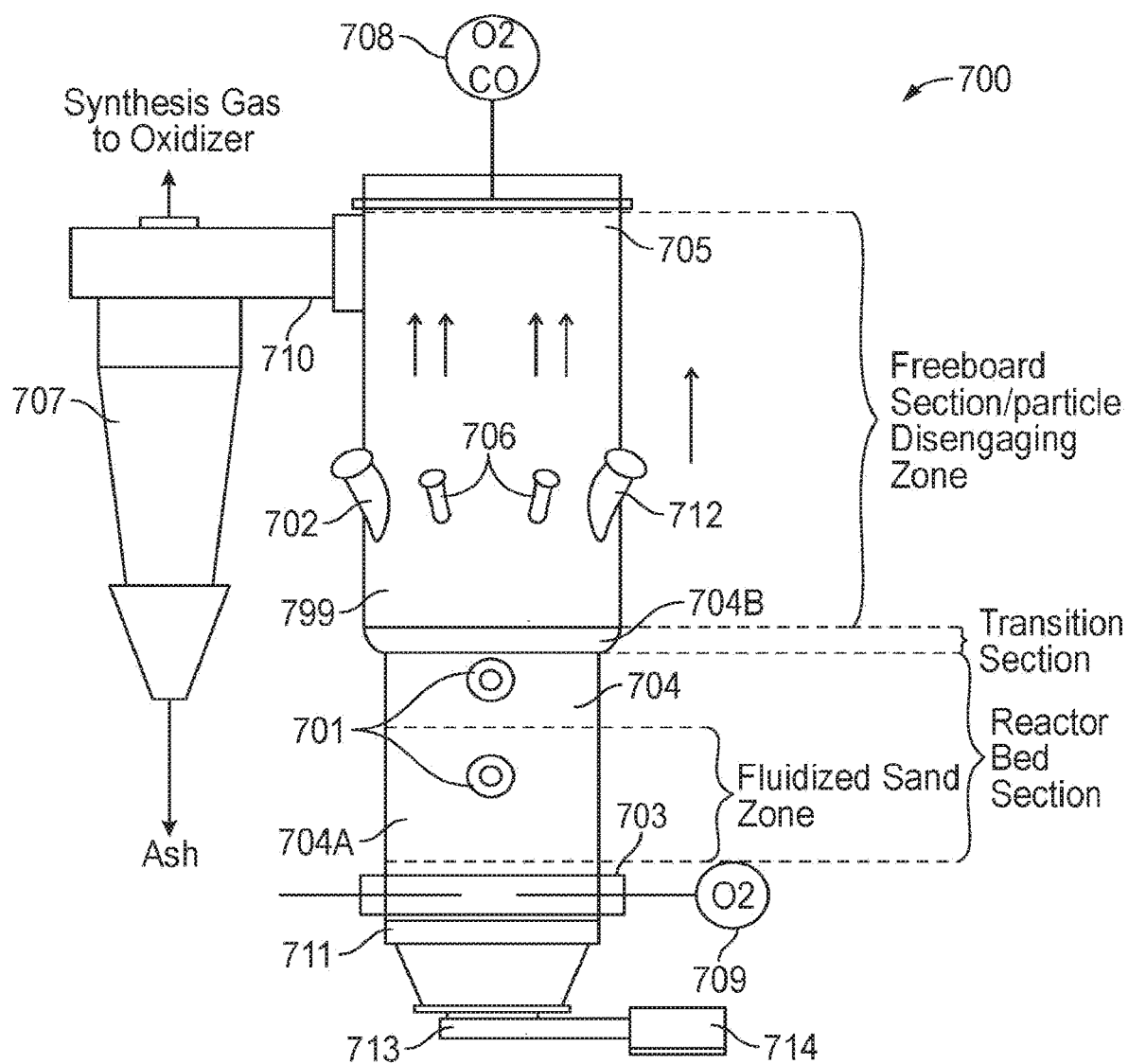
FIG. 7 shows a schematic side view illustrating the larger scaled up fluidized bed gasifier of FIG. 6 in accordance with an embodiment of the invention.

FIG. 7 shows a scaled-up embodiment of a bubbling type fluidized bed gasifier 700. In one embodiment, the bubbling fluidized bed gasifier 700 will include a reactor 799 operably connected to the feeder system (shown in FIG. 1) as an extended part of the standard gasifier system 700. A fluidized media bed 704A such as but not limited to quartz sand is in the base of the reactor vessel called the reactor bed section 704. In one embodiment, the fluidized sand is a zone that has a temperature of 1150° F.-1600° F. Located above the reactor bed section 704 is a transition section 704B and above the transition section 704B is the freeboard section 705 of the reactor vessel 799. Fluidizing gas consisting of air, flue gas, pure oxygen or steam, or a combination thereof, is introduced into the fluidized bed reactor 799 to create a velocity range inside the freeboard section 705 of the gasifier 700 that is in the range of 0.1 m/s (0.33 ft/s) to 3 m/s (9.84 ft/s). The biosolids are heated inside the fluidized bed reactor to a temperature range between 900° F. and 1600° F. in an oxygen-starved environment having sub-stoichiometric levels of oxygen, e.g., typically oxygen levels of less than 45% of stoichiometric. In another embodiment, the fluidized sand is a zone that has a temperature of 1150° F.-1600° F.

The reactor fluidized bed section 704 of a fluidized bubbling bed gasifier 700 is filled with a fluidizing media 704A that may be a sand (e.g., quartz or olivine), or any other suitable fluidizing media known in the industry. Feedstock such, as but not limited to sludge, is supplied to the reactor bed section 704 through fuel feed inlets 701 at 40-250° F. In one embodiment, the feedstock is supplied to the reactor bed section 704 through fuel feed inlets 701 at 215° F.; with the gas inlet 703 in the bubbling bed receiving an oxidant-based fluidization gas such as but not limited to e.g., gas, flue gas, recycled flue gas, air, enriched air and any combination thereof (hereafter referred to generically as "gas" or "air"). In one embodiment, the air is at about 600° F. The type and temperature of the air is determined by the gasification fluidization and temperature control requirements for a particular feedstock. The fluidization gas is fed to the bubbling bed via a gas distributor, such as shown in FIGS. 3 and 8A-B. An oxygen-monitor 709 may be provided in communication with the fluidization gas inlet 703 to monitor oxygen concentration in connection with controlling oxygen levels in the gasification process. An inclined or over-fire natural gas burner (not visible) located on the side of the reactor vessel 799 receives a natural gas and air mixture via a port 702. In one embodiment, the natural gas air mixture is 77° F. which can be sued to start up the gasifier and heat the fluidized bed media 704A. When the minimum ignition temperature for self-sustaining of the gasification reactions is reached (~900° F.), the natural gas is shut off. View ports 706 and a media fill port 712 are also provided.

In one embodiment, a freeboard section 705 is provided between the fluidized bed section 704 and the producer gas outlet 710 of the gasifier reactor vessel 799. As the biosolids thermally decompose and transform in the fluidized bed media section (or sand zone) into producer gas and then rise through the reactor vessel 799, the fluidizing medium 704A in the fluidized bed section 704 is disentrained from the producer gas in the freeboard section 705 which is also known as and called a particle disengaging zone. A cyclone separator 707 may be provided to separate material exhausted from the fluidized bed reactor 799 resulting in clean producer gas for recovery with ash exiting the bottom of the cyclone separator 707 alternatively for use or disposal.

An ash grate 711 may be fitted below the gasifier vessel for bottom ash removal. The ash grate 711 may be used as a sifting device to remove any large inert, agglomerated or heavy particles so that the fluidizing media and unreacted char can be reintroduced into the gasifier for continued utilization. In one embodiment, a valve such as but not limited to slide valve 713 which is operated by a mechanism to open the slide valve 714 is located beneath the ash grate 711 to collect the ash. In one embodiment, a second valve 713 and operating mechanism 714 (no shown) are also located below the cyclone separator 207 for the same purpose. That is as a sifting device to remove any large inert, agglomerated or heavy particles so that the fluidizing media and unreacted char can be reintroduced into the gasifier for continued utilization. In one embodiment the ash grate 711 may be a generic solids removal device known to those of ordinary skill in the art. In another embodiment, the ash grate 711 may be replaced by or combined with the use of an overflow nozzle.

A producer gas control 708 monitors oxygen and carbon monoxide levels in the producer gas and controls the process accordingly. In one embodiment, a gasifier feed system (shown in FIGS. 1 and 9-11) feeds the gasifier reactor 799 through the fluidized fuel inlets 701. In one embodiment, the gasifier unit 700 is of the bubbling fluidized bed type with a custom fluidizing gas delivery system and multiple instrument control. The gasifier reactor 799 provides the ability to continuously operate, discharge ash and recycle flue gas for optimum operation. The gasifier reactor 799 can be designed to provide optimum control of feed rate, temperature, reaction rate and conversion of varying feedstock into producer gas.

A number of thermocouple probes (not shown) are placed in the gasifier reactor 799 to monitor the temperature profile throughout the gasifier. Some of the thermal probes are placed in the fluidized bed section 704 of the gasifier rector 799, while others are placed in the freeboard section 705 of the gasifier. The thermal probes placed in the fluidized bed section 704 are used not only to monitor the bed temperature but are also control points that are coupled to the gasifier air system via port 702 in order to maintain a certain temperature profile in the bed of fluidizing media. There are also a number of additional control instruments and sensors that may be placed in the gasifier system 700 to monitor the pressure differential across the bed section 704 and the operating pressure of the gasifier in the freeboard section 205. These additional instruments are used to monitor the conditions within the gasifier as well to as control other ancillary equipment and processes to maintain the desired operating conditions within the gasifier. Examples of such ancillary equipment and processes include but are not limited to the cyclone, thermal oxidizer and recirculating flue gas system and air delivery systems. These control instruments and sensors are well known in the industry and therefore not illustrated.

With reference to FIG. 7, an optional ash grate 711 may be fitted below the gasifier vessel for bottom ash removal. The ash grate 711 may be used as a sifting device to remove any agglomerated particles so that the fluidizing media and unreacted char can be reintroduced into the gasifier for continued utilization. In one embodiment, a slide valve 713 operated by a mechanism to open the slide valve 714 is located beneath the ash grate 711 to collect the ash. In one embodiment, a second slide valve 713 and operating mechanism 714 are located below the cyclone separator 707.

As with the small format fluidized bed gasifier, some unreacted carbon is carried into the cyclone separator 707 with particle sizes ranging from 10 to 300 microns. When the solids are removed from the bottom of the cyclone, the ash and unreacted carbon can be separated and much of the unreacted carbon recycled back into the gasifier, thus increasing the overall fuel conversion to at least 95%. Ash accumulation in the bed of fluidizing media may be alleviated through adjusting the superficial velocity of the gases rising inside the reactor. Alternatively, bed media and ash could be slowly drained out of the gasifier base and screened over an ash grate 711 before being reintroduced back into the gasifier. This process can be used to remove small agglomerated particles should they form in the bed of fluidizing media and can also be used to control the ash-to-media ratio within the fluidized bed.

With continued reference to FIG. 7, a feedstock such as but not limited to biosolid material can be fed into the gasifier by way of the fuel feed inlets 701 from more than one location on the reactor vessel 799 and wherein said fuel feed inlets 701 may be variably sized such that the desired volumes of feedstock are fed into the gasifier through multiple feed inlets 701 around the reactor vessel 799 to accommodate a continuous feed process to the gasifier. For the present invention and in one embodiment, the number of fuel feed inlets is between 2-4. The minimum number of feed inlets 701 is based, in part, on the extent of extent of back mixing and radial mixing of the char particles in the bed and on the inside diameter of the reactor bed section 704. For bubbling fluidized beds, one feed point could be provided per 20 ft$^2$ of bed cross sectional area. For example, and in one embodiment, if the reaction bed section has an internal diameter of 9 ft, the reactor vessel 799 will have at least 3 feed inlets 701 which may be located equidistant radially to maintain in-bed mixing. Feed inlets 701 may be considered all on one level, or on more than one level or different levels and different sizes.

FIG. 8A shows a cut away perspective view illustrating a pipe gas distributor of the biogasifier in accordance with an embodiment of the invention. FIG. 8B shows a side elevational view illustrating a pipe gas distributor of the biogasifier in accordance with an embodiment of the invention. In one embodiment, the invention has a pipe distributor design with a main air inlet 801, said main air inlet 801 having an upper portion 801A and lower portion 801B. In one embodiment, the lower portion 801B is connected a pipe 812 such as but not limited to an elbow or j-pipe. In one embodiment, the lower portion 801B is connected to a pipe 812 using a male mounting seal that is connected to a female mounting seal 803 that is connected to a female mounting stub that is connected to the pipe 812. In one embodiment, the pipe 812 has a proximal end 812A and terminal end 812B wherein the proximal end 812A is mechanically connected to the main air inlet 801 and the terminal end 812B is connected to the gas inlet 703. In one embodiment, the pipe 812B terminal end has a flange 811 to connect to the gas inlet 703.

The upper portion of the main air inlet 801A is aligned with and an opening in a center trunk line 806, said trunk line 806 having at least 10 lateral air branches 805 that are open on one end to the center trunk line and closed on the other end. In one embodiment the lateral air branches 805 are symmetrically spaced on either side of the center trunk line 806. In one embodiment, the lateral air branches 805 are of varying length to fit symmetrically within the diameter of the bottom of the reactor bed 204. In one embodiment, each of the lateral air branches 805 comprise downward pointing gas and air distribution nozzles 810 which are also called, gas and air distribution ports 810. The air distribution nozzles 810 are pointed downward so the air entering from the main air inlet 801 is injected in a downward motion into the cone-shaped bottom of the gasifier reactor 799. In one embodiment the distribution nozzles 810 point downward at an angle such as but not limited to a 45-degree angle. The configuration and general locations of nozzles and components differ from the tuyere design for the smaller reactor vessel in that fewer gas/air distribution nozzles are required in a tuyere design to meet the fluidization requirements and good mixing requirements but still enough to enable the full volume of the fluidizing media material to fluidize when slumped in the bottom cone section of the reactor. This is also an essential part of the reactor.

FIG. 9. shows a perspective view of multiple universal gasifier feeder systems connected to a gasifier in accordance with an embodiment of the invention. With reference to FIG. 9 the feedstock is gravity fed from a feed port 109 located on top to the feeder vessel 101. In one embodiment, the vessel 101 is rectangular shaped having three vertical sides and an angled side 110. The angled side 110 has a slope of no less than 60 degrees from the horizontal to facilitate proper flow of bio-feedstock materials that have different and/or variable flow properties. At least one side of the vessel 101 needs to be angled, although the vertical sides can also be between vertical and a have a negative angle between 0 and 15 degrees. The no less than 60-degree angle 110 together with aeration using aeration ports 107 (shown in FIG. 11) and other means such as inserting removable bridge breakers (not shown) located within the vessel 101 can assist with and modulate flow of vary feedstock.

The length of the live bottoms dual screw 102 and transfer screw 103 may vary and depend in the space available to locate the vessel 101 and distance to the gasifier 200. The transfer screw 103 may be equipped with a cooling jacket 104 shown in FIG. 1 in the event of the feedstock or feedstock combinations has a recommended minimum flammability temperature that requires the feedstock to be cooled. In one embodiment, the feed system 100 includes more than one transfer screw 103 that can operate as metering screws that are then connected to a transfer screw that can operate as a high-speed injection screw conveying the feedstock into the gasifier reactor vessel 299. In one embodiment, load cells or metering screw systems are used in place of the live bottoms dual screw and transfer screw to control the feed rate to the gasifier.

FIG. 10 shows a top view of multiple feeder systems 100 and a single gasifier reactor vessel 299 with sample screw connections and multiple feed points via the fuel deed inlets 201 in accordance with an embodiment of the invention.

FIG. 11 shows a side view of the universal gasifier feeder system 100 with a cut away view of a gasifier reactor vessel 299 to which the transfer screw 103 of the feeder system is attached via at least fuel feed inlet 201 of the gasifier 200 in accordance with an embodiment of the invention. In one embodiment, the transfer screw 103 terminates at the fuel feed inlet 201. In another embodiment, the transfer screw 103 protrudes into the bed section 204 of the reactor vessel 299. In this embodiment, sample bin capacity is shown as 3.5 tons of feedstock for a single feed vessel with an internal temperature of the feed vessel at 200° F. In one embodiment, the internal operating temperature of the gasifier reactor 299 is about 1200° F. Multiple sensors (not shown) can be included to monitor pressure and temperature within the reactor vessel. One such sensor such as feed level sensors 105. Another embodiment may also include a feed view port 108 located on the open bottom chute 111.

The location of the aeration ports 107 can be variable in size and location and on any side of the vessel. The number of ports 107 can also be increased or decreased depending on the type and number of bridge breaking features and size of the feed vessel 101. Adjustable aeration features that uses either air or an inert gas, assists with avoiding bridging and maintaining flow to the transfer screws 103. The feed vessel 101 terminates in an open bottom chute 111 and a live bottoms dual screw feeder design 102 is located below the chute 111. The screw feeder 102 conveys the feedstock to another open bottom chute 111 that drops the feedstock by gravity directly onto the transfer screw 103. The screw feeder 103 conveys the feedstock either to another transfer screw feeder 103 by the same gravity/chute mechanism or conveys the feedstock to a gasifier reactor 299 via a fluidized fuel feed inlet 201. The connection of the transfer screw 103 to the feed inlet 201 is mechanical such as by a flange 116 to flange 116 connection.

Figure 12:
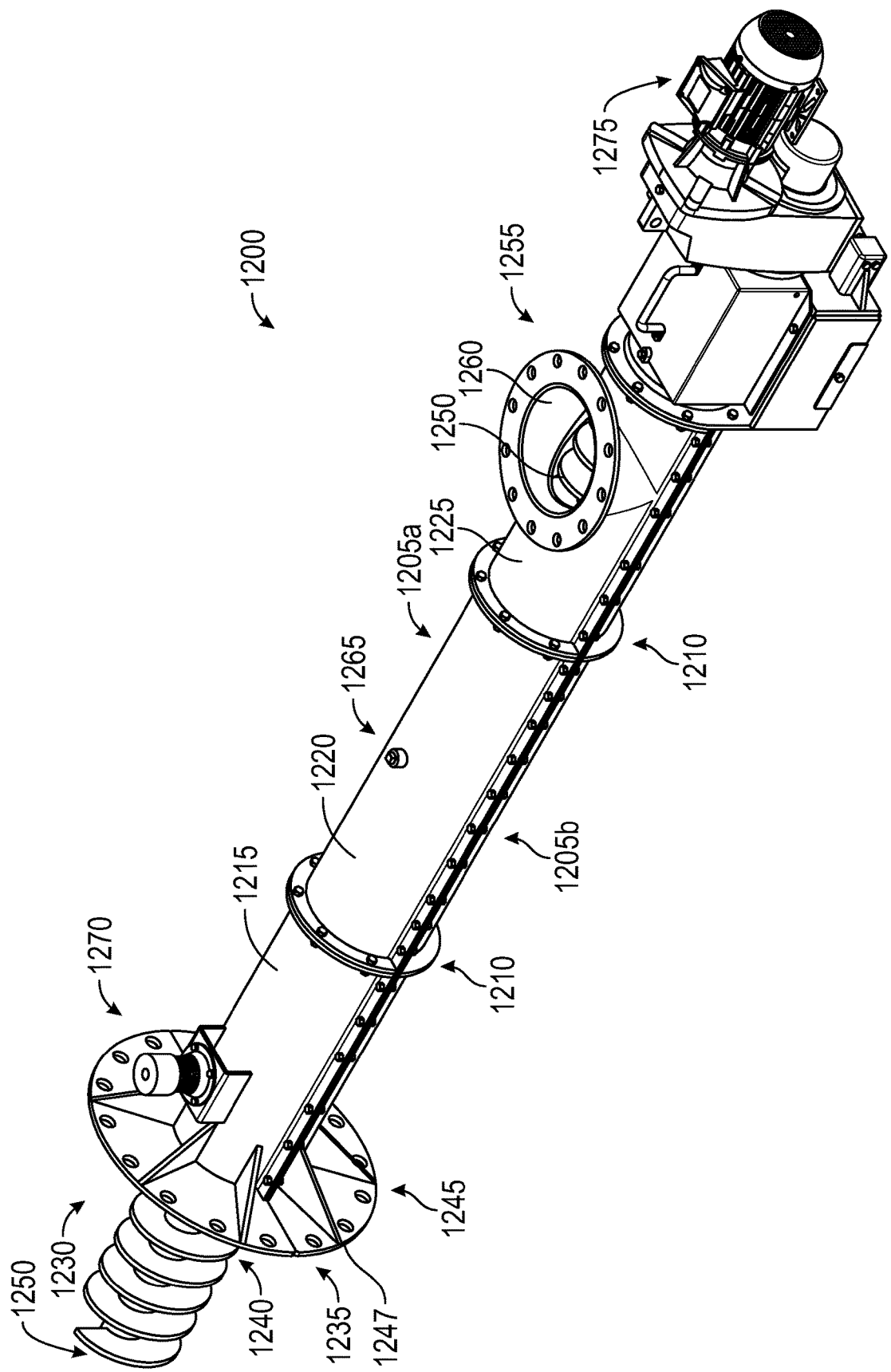
FIG. 12 shows a perspective view of an exemplary universal multi-section clamshell screw feeder pipe implementation configured with a top section and a bottom section designed to be separated during production operation, permitting access to the screw and the pipe interior for inspection, maintenance, and clearing blockages.

FIG. 12 shows a perspective view of an exemplary universal multi-section clamshell screw feeder pipe implementation configured with a top section and a bottom section designed to be separated during production operation, permitting access to the screw and the pipe interior for inspection, maintenance, and clearing blockages. In FIG. 12, the exemplary universal multi-section clamshell screw feeder pipe 1200 comprises the top section 1205a and the bottom section 1205b configured in a clamshell type design. In the implementation depicted by FIG. 12, the top section 1205a and the bottom section 1205b are bolted together. In the depicted implementation, the section flanges 1210 are split flanges joining the top section outlet segment 1215, the top section center segment 1220, and the top section inlet segment 1225 to form the top section 1205a. The connections between the section flanges 1210 may comprise gaskets designed to provide a gas-tight seal for the screw feeder pipe 1200 and maintain positive pressure from the feeder pipe into a reactor vessel such as a gasifier. The top section 1205a or the bottom section 1205b may comprise one or more segment. In the depicted implementation the outlet 1230 is configured with the outlet flange 1235 designed to couple the universal multi-section clamshell screw feeder pipe 1200 outlet 1230 with a reactor vessel. The reactor vessel may be, for example, a gasifier. In the depicted implementation, the outlet flange 1235 is a split flange comprising the outlet flange top 1240 and the outlet flange bottom 1245. In the depicted implementation the outlet flange top 1240 and the outlet flange bottom 1245 are separated by the flange split 1247. Separating the outlet flange top 1240 and the outlet flange bottom 1245 using the flange split 1247 permits access to the pipe interior and the screw 1250 during production operation. In the illustrated implementation, the universal multi-section clamshell screw feeder pipe 1200 may be opened for inspection and maintenance access to the pipe interior and the screw 1250, for inspection of the screw 1250, screw 1250 flight adjustment, cleaning the pipe in the event of blockage, and maintenance without having to remove the screw 1250. The depicted universal multi-section clamshell screw feeder pipe 1200 may be opened by unbolting and separating the pipe top section 1205a from the bottom section 1205b, and/or unbolting and removing any or all of the top section outlet segment 1215, the top section center segment 1220, or the top section inlet segment 1225. In the depicted implementation, the inlet flange 1255 is configured to connect the inlet 1260 to a feedstock feed. The feedstock feed may be received at the inlet 1260 from a feed vessel. In the implementation depicted by FIG. 12, the universal multi-section clamshell screw feeder pipe 1200 is configured to receive a feedstock feed at the inlet 1260 and move the feedstock through the pipe to the outlet 1230 using the screw 1250. The inlet 1260 may be operably coupled with a feedstock feed source using the inlet flange 1255. The inlet flange 1255 may be a split flange. The inlet flange 1255 and outlet flange 1235 may be configured to operably couple the screw feeder pipe 1200 with a feedstock feed source and a reactor vessel using one or more gasket. In an illustrative example, the gaskets may control or prevent gas from backflowing from the screw feeder pipe into a feed bin coupled with the inlet 1260. For example, in some exemplary scenarios an operational screw feeder pipe implementation in accordance with the present disclosure may experience a side pressure difference from a feedstock feed source such as a feed bin into a reactor vessel such as a gasifier connected to the screw feeder pipe. In such an exemplary scenario, the gasket may prevent gas from backflowing into the feed bin through the screw feeder pipe/transfer screw, as a result of a gas-tight seal provided by the gaskets. In an illustrative example, such an inlet gasket implementation may improve safety and reduce the chance of fire or explosion, as a result of preventing gas from backflowing from the reactor vessel or gasifier through the screw feeder pipe into a feed source. In the depicted implementation, the top section center segment 1220 is configured with the inspection port 1265 permitting visual, hand, or sensor/test instrument access to the interior of the pipe during production for material adjustment or measurement, without disassembling the pipe or halting operation. In the implementation depicted by FIG. 12, the top section outlet segment 1215 is configured with the sensor/switch port 1270 for measurement or process control sensor/switch access to the material flow in the pipe proximal to the outlet 1230. In the depicted implementation, the screw 1250 may be driven by the screw drive unit 1275. The screw 1250 may be driven by a motorized axle connected to the screw drive unit 1275.

A universal multi-section clamshell screw feeder pipe implementation in accordance with the teaching of the present disclosure may achieve one or more technical effect. For example, downtime may be reduced, and the availability of online access may increase, as a result of the disclosed universal multi-section clamshell screw feeder pipe design that permits more precise and efficient diagnosis and resolution of trouble (for example, to do maintenance work, repair or inspect) in a particular pipe section during production using one or more removable top section. For example, an exemplary universal multi-section clamshell screw feeder pipe implementation may improve efficiency of operational adjustments to screw flights by allowing access to the conveying screw for inspection and permit cleaning when blocked, as a result of a screw feeder pipe design providing one or more removable top section. Some implementations may improve ease of replacing clamshell sections and permit optimizing screw feeder pipe design using more shorter or longer clamshell sections. In some design examples, an implementation using one or more removable top section may permit access to the feedstock flow for applying surface coatings to address stickiness or flow properties, for example, wood chips vs plastics vs biosolids, depending on the type of feedstock. Some implementations may permit changes to/additions of feed/view ports by modifying one or more clamshell section, based on removing a removable section and replacing the removable section with a new section modified to satisfy predetermined technical specifications. In some example designs, removing one or more removable clamshell section may reduce effort and improve safety when adding seals/seal material to feedstock during production to address feedstock related requirements, such as, for example, gas tightness, adjustment for temperatures, or fine sand attrition leaks.

Figure 13:
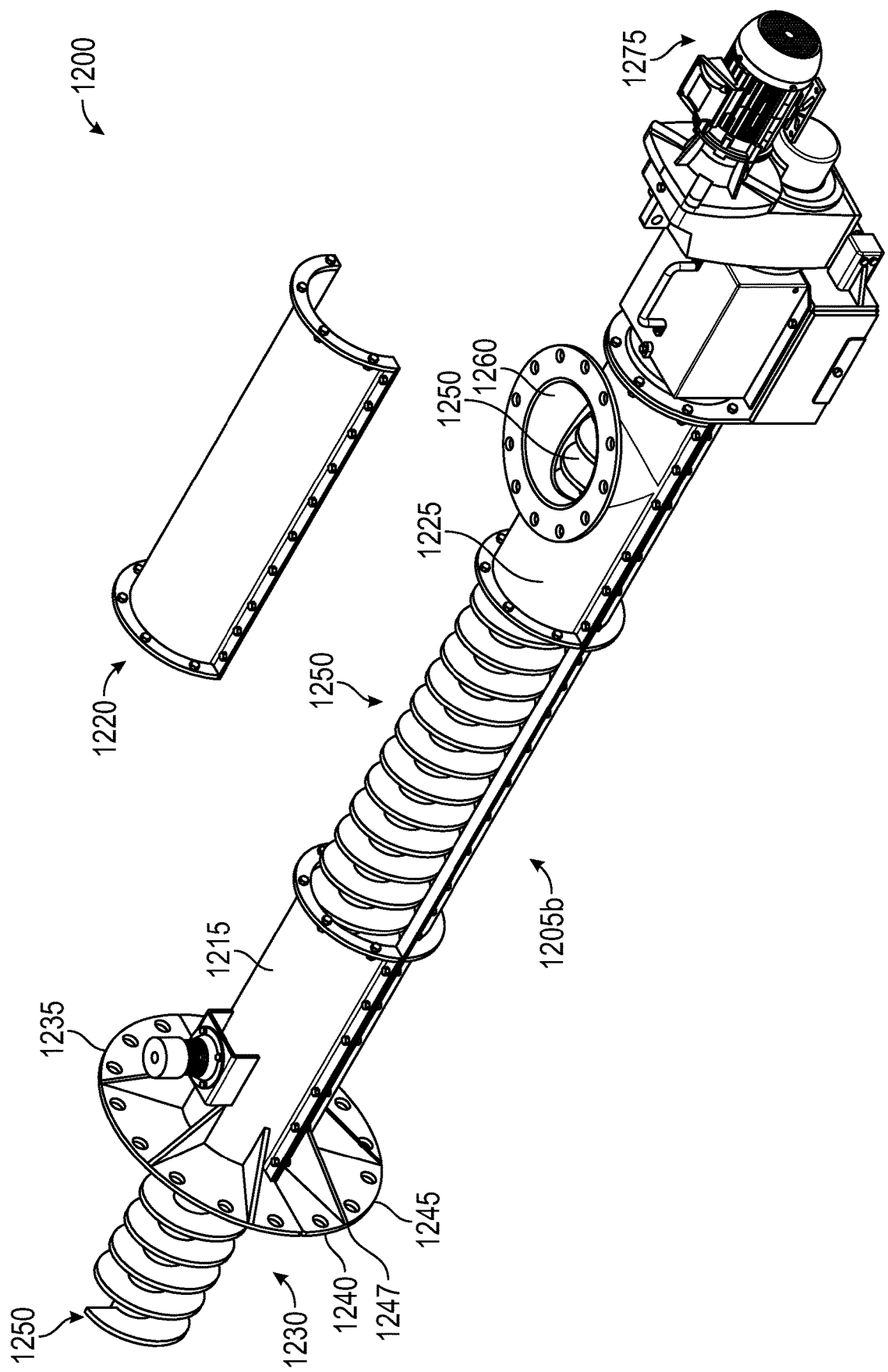
FIG. 13 shows a perspective view of the exemplary universal multi-section clamshell screw feeder pipe implementation depicted by FIG. 12 with one top section segment removed in an exemplary inspection/maintenance mode, providing access to the screw.

FIG. 13 shows a perspective view of the exemplary universal multi-section clamshell screw feeder pipe implementation depicted by FIG. 12 with one top section segment removed in an exemplary inspection/maintenance mode, providing access to the screw. In FIG. 13, the exemplary universal multi-section clamshell screw feeder pipe 1200 comprises the features described with reference to FIG. 12, and further comprises the top section center segment 1220 removed for access to the screw 1250. The screw 1250 may be configured with a motion sensor target 1405 or motion sensor (described with reference to FIG. 14B) to permit measuring the screw 1250 rotation during production for material or screw flight adjustment, without disassembling the pipe or halting operation.

Figures 14A, 14B:
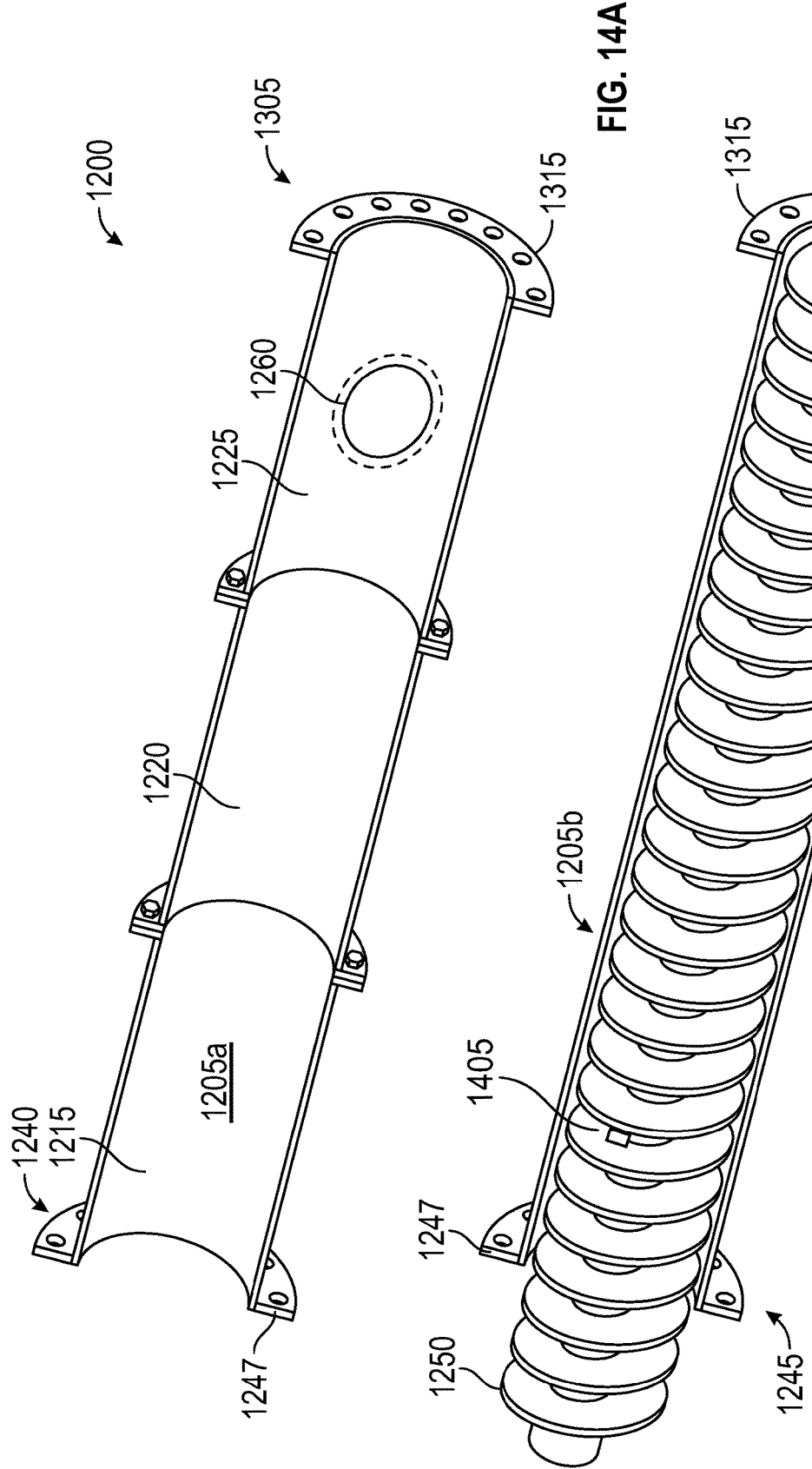
FIG. 14A shows a perspective view of the interior of the top section of the exemplary universal multi-section clamshell screw feeder pipe implementation depicted by FIG. 12, in an exemplary disassembled mode.
FIG. 14B shows a perspective view of the interior of the bottom section of the exemplary universal multi-section clamshell screw feeder pipe implementation depicted by FIG. 12, in an exemplary disassembled mode.

FIG. 14A shows a perspective view of the interior of the top section of the exemplary universal multi-section clamshell screw feeder pipe implementation depicted by FIG. 12, in an exemplary disassembled mode. In FIG. 14A, the exemplary universal multi-section clamshell screw feeder pipe 1200 top section 1205a interior is depicted illustrating the underside of the top section 1205a. The inlet flange top 1305 is the top portion of the inlet flange 1315. The inlet flange 1315 is a split flange.

FIG. 14B shows a perspective view of the interior of the bottom section of the exemplary universal multi-section clamshell screw feeder pipe implementation depicted by FIG. 12, in an exemplary disassembled mode. In FIG. 14B, the exemplary universal multi-section clamshell screw feeder pipe 1200 bottom section 1205b interior is depicted illustrating access to the screw 1250. In the depicted implementation the inlet flange bottom 1310 is the bottom portion of the split inlet flange 1315. In the implementation depicted by FIGS. 14A-14B, the screw 1250 is configured with the motion sensor target 1405. The motion sensor target 1405 may be configured in a flight of the screw 1250. The motion sensor target 1405 may be configured in a portion of the screw 1250 enclosed by the pipe top section 1205a or the bottom section 1205b. The motion sensor target 1405 may be an optical target designed with optically reflective material configured to reflect invisible light or visible light. The motion sensor target 1405 may comprise an electronic sensor configured to sense motion of the screw 1250 and convert the screw 1250 motion to an electronic signal encoding the motion of the screw 1250. The motion sensor may communicate the electronic signal encoding screw 1250 motion to an operator or a control system. The screw 1250 motion sensor may comprise, for example, an accelerometer, or a proximity sensor. The screw 1250 motion sensor may be a proximity sensor configured to send a signal indicating the sensor's proximity to a stationary object, to indicate the rotation of the screw 1250 as the screw 1250 rotates. An implementation in accordance with the present disclosure may use the screw 1250 motion sensor target or motion sensor to indicate the screw 1250 is rotating, and to determine the screw 1250 rotation speed, or determine the rate of material flow into a reactor vessel during production operation without opening the screw feeder pipe. The motion sensor target 1405 or motion sensor may be configured in the screw 1250 to be accessible using the sensor/switch port 1270 or the inspection port 1265 (depicted, for example, by FIG. 12) to permit measuring the screw 1250 rotation during production for material or screw flight adjustment, without disassembling the pipe or halting operation.

Figure 15A:
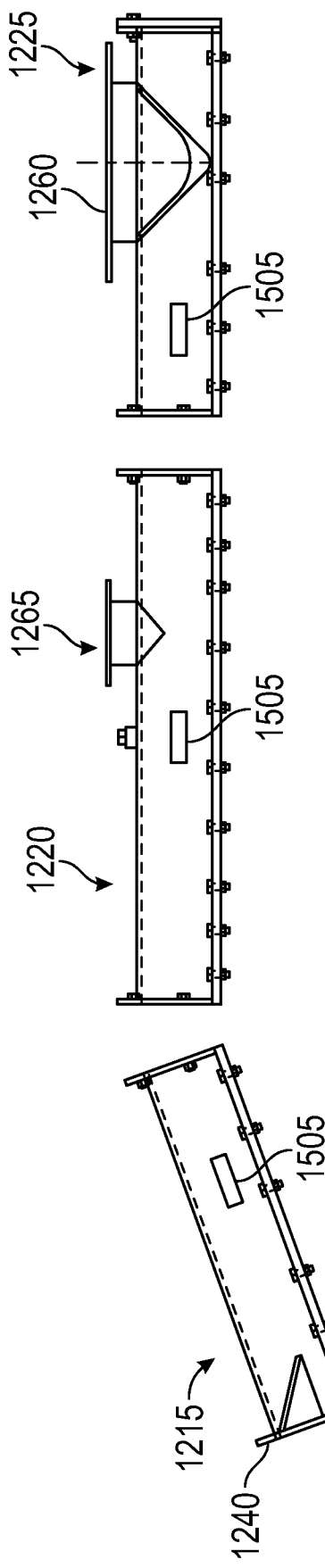
FIG. 15A shows a side view of three top section segments of the exemplary universal multi-section clamshell screw feeder pipe implementation depicted by FIG. 12, in an exemplary disassembled mode.

FIG. 15A shows a side view of three top section segments of the exemplary universal multi-section clamshell screw feeder pipe implementation depicted by FIG. 12, in an exemplary disassembled mode. In FIG. 15A, the top section outlet segment 1215, the top section center segment 1220, and the top section inlet segment 1225 are each configured with the respective handles 1505. The top section outlet segment 1215, the top section center segment 1220, and the top section inlet segment 1225 may be configured with respective hinges permitting opening the respective segments by lifting the handles. The top section outlet segment 1215, the top section center segment 1220, and the top section inlet segment 1225 may be individually bolted, hinged, bolted or hinged, or bolted and hinged, to be opened with the respective handles 1505. The handles 1505 may be located on the side or the top of the respective top section outlet segment 1215, the top section center segment 1220, and the top section inlet segment 1225.

Figure 15B:
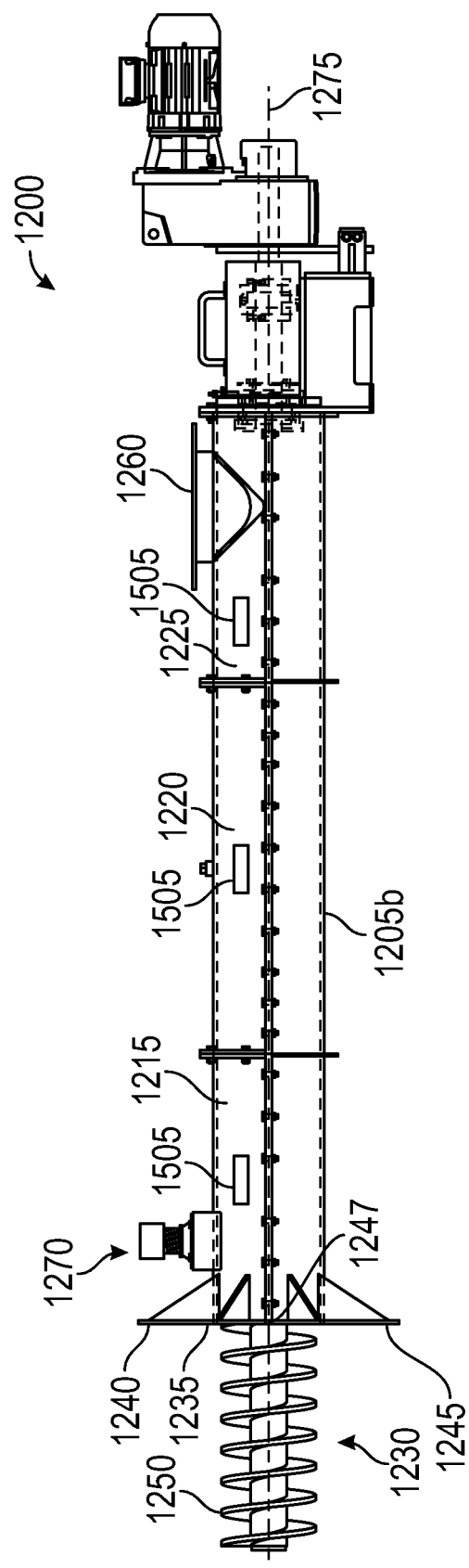
FIG. 15B shows a side view of the exemplary universal multi-section clamshell screw feeder pipe implementation depicted by FIG. 12, in an exemplary assembled mode.

FIG. 15B shows a side view of the exemplary universal multi-section clamshell screw feeder pipe implementation depicted by FIG. 12, in an exemplary assembled mode.

Figure 15C:
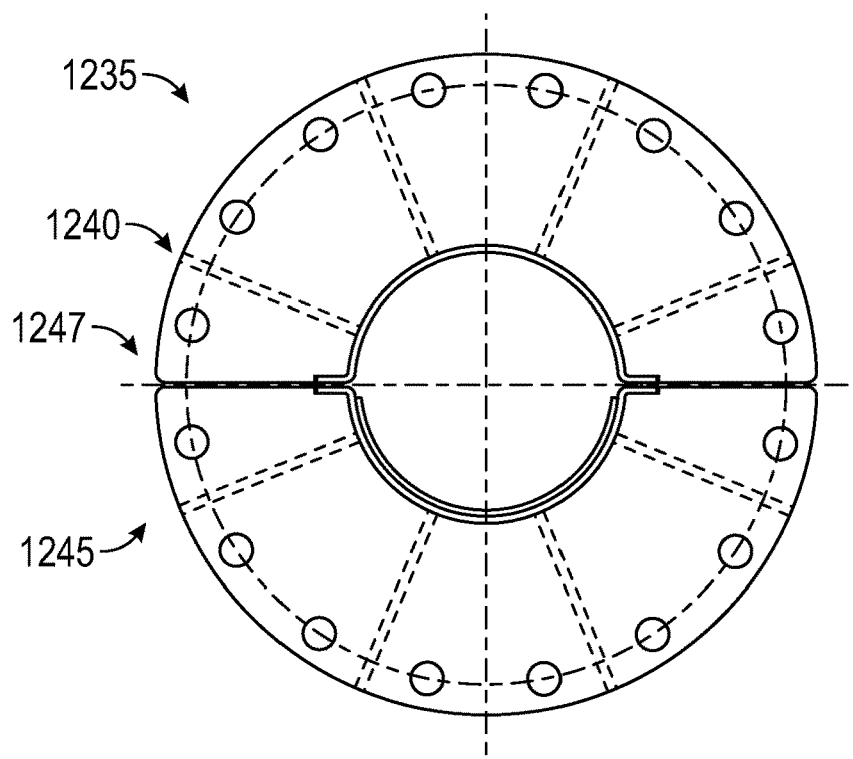
FIG. 15C shows a front view of an exemplary outlet flange designed with a top and bottom for use with the top and bottom section of the exemplary universal multi-section clamshell screw feeder pipe implementation depicted by FIG. 12.

FIG. 15C shows a front view of an exemplary outlet flange designed with a top and bottom for use with the top and bottom section of the exemplary universal multi-section clamshell screw feeder pipe implementation depicted by FIG. 12. In FIG. 15C, the flange split 1247 permits separating the outlet flange top 1240 from the outlet flange bottom 1245.

Figure 16:
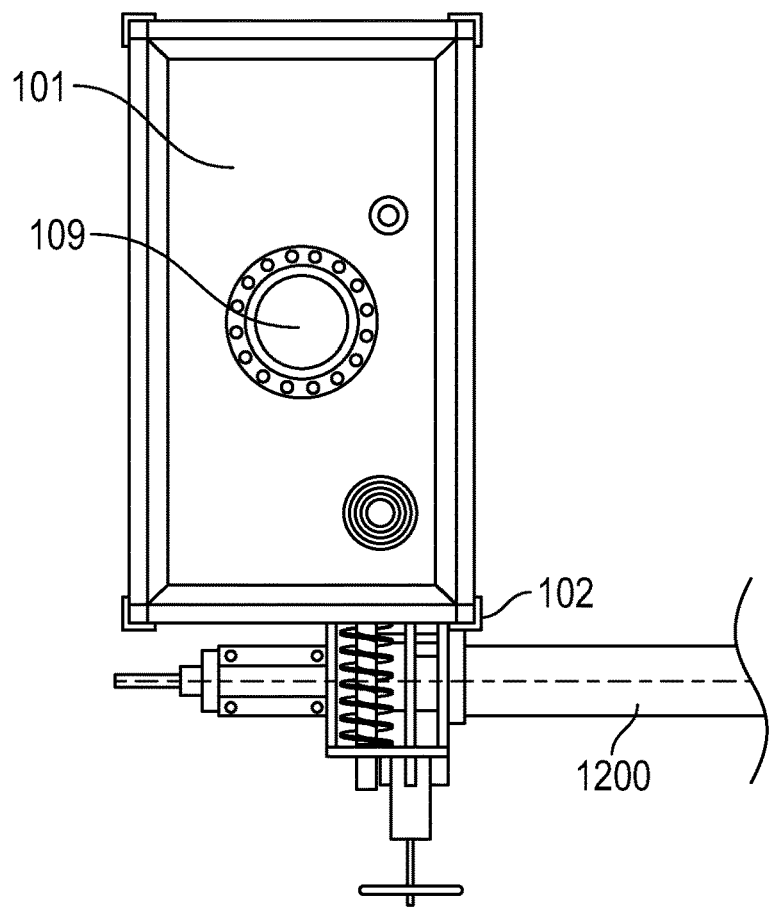
FIG. 16 shows an exemplary universal multi-section clamshell screw feeder pipe implementation configured to transfer a feedstock feed from a feed vessel to a reactor vessel.

FIG. 16 shows an exemplary universal multi-section clamshell screw feeder pipe implementation configured to transfer a feedstock feed from a feed vessel to a reactor vessel. In FIG. 16, the feed vessel 101 is configured to receive feedstock using the feed vessel port 109. The live bottom dual screw feeder 102 is operably coupled with the feed vessel 101. The universal multi-section clamshell screw feeder pipe 1200 is configured to move a feedstock feed from the live bottom dual screw feeder 102 to a reactor vessel configured to be operably coupled with the universal multi-section clamshell screw feeder pipe 1200. The reactor vessel may be a gasifier.

In an aspect, an exemplary implementation of a universal feeder system for transferring a feedstock feed may comprise: a first vessel comprising at least one rectangular shaped feed vessel having an upper horizontal side and an open lower horizontal side, three vertical sides and an angled side of no less than 60 degrees from the lower horizontal side; a motor operated variable speed live bottom dual screw feeder positioned below and parallel to the open lower horizontal side; said dual screw feeder having a proximal and distal end, wherein said dual screw feeder is operably connected to the lower horizontal side; a first chute having an open top and bottom; said top juxtaposed to the distal end of the dual screw feeder to receive conveyed material from the feedstock feed; a first motor operated variable speed transfer screw feeder juxtaposed to the bottom of the first chute that conveys material; said first transfer screw feeder having a proximal end and a distal end, wherein the first transfer screw is positioned adjacent and perpendicular to the distal end of the live bottom dual screw feeder, wherein the first transfer screw feeder distal end is configured with a flange designed to operably connect the first transfer screw feeder to a second vessel; a second transfer screw feeder juxtaposed to the bottom of the first chute that conveys material; said second transfer screw feeder having a proximal end and a distal end, wherein the second transfer screw feeder is positioned adjacent and perpendicular to the proximal end of the live bottom dual screw feeder; and a third transfer screw feeder having a proximal end and a distal end, wherein the third transfer screw feeder proximal end is operably connected to the second transfer screw feeder distal end, wherein the third transfer screw feeder is positioned perpendicular to the second transfer screw feeder, and wherein the third transfer screw feeder distal end is configured with a flange designed to operably connect the third transfer screw to the second vessel.

The universal feeder system may further comprise aeration ports located on the sides of the feed vessel and removable bridge breakers attached inside the feed vessel.

The feedstock feed may comprise material selected from the group comprising sewage sludge, municipal solid waste, wood waste, refuse derived fuels, automotive shredder residue and non-recyclable plastics.

The feedstock feed may comprise material selected from the group comprising two or more feedstocks.

The first transfer screw feeder and the second transfer screw feeder may further comprise a coolant jacket configured to maintain the feed temperature between 60° F.-200° F.

The second vessel may be a gasifier reactor vessel, and the gasifier reactor vessel may be cylindrical in shape having a bottom with an inverted cone section and further comprising: a freeboard section comprising the top half of the reactor vessel, said freeboard section having a diameter sized to contain the gas produced from the conversion of more than 40 tons of fuel per day; a fluidized bed in a bed section within said reactor vessel located beneath the freeboard section, said fluidized bed having a diameter sized to process and convert more than 40 tons of fuel into gas per day; at least two fuel feed inlets located beneath the freeboard section, said fuel inlets configured to feed a fuel into said reactor vessel at a fuel feed rate of more than 40 tons of fuel per day during steady-state operation of the gasifier; and a gas distributor located within the inverted cone section of the reactor vessel.

The gas distributor may be a pipe distributor comprising: a main air inlet, a center trunk line having lateral air branches; and an array of nozzles located on each of the lateral air branches.

The cone section of the reactor vessel may further comprise: at least one gas inlet that feeds air and flue gas to the pipe distributor main air inlet and an array of nozzles whereby the gas is directed into the fluidized bed section of the reactor vessel.

The lateral air branches may be open on one end to receive gas from the center trunk line and closed on the other end.

The center trunk line may have at least 10 lateral air branches.

The lateral air branches may be symmetrically spaced about the center trunk line.

The freeboard section may have a diameter of at least 137 inches and the fluidized bed may have a diameter of at least 108 inches.

The main air inlet may have an upper and lower portion wherein the upper portion may be aligned with an opening in the center trunk line and the lower portion of the main air inlet may be connected to a pipe that may be connected to the gas inlet.

The pipe may be connected to the gas inlet with a flange.

The lateral air branches may be of varying length to fit symmetrically within the diameter of the bottom of the reactor bed.

Each of the nozzles may be configured to direct the gas downward into the bottom of the reactor vessel.

The nozzles may be configured to direct the gas downward at a 45-degree angle.

The reactor may further comprise at least one inlet for addition of an inert media.

The reactor may further comprise an outlet for agglomerates; and an outlet for producer gas.

The reactor may further comprise an ash grate fitted below the bottom of the reactor.

The distal end of the first transfer screw may terminate in a feed nozzle mechanically connected to at least one fuel feed inlet located on a gasifier reactor vessel.

The proximal end and distal end of the live bottom dual screw feeder may extend beyond at least two of the vertical sides of the feed vessel.

The dual live bottom screw feeder may be configured to convey material from the feed vessel in two different directions and the universal feeder system may further comprise the third transfer screw feeder distal end terminating in a feed nozzle, wherein the feed nozzle may be mechanically connected to at least one fuel feed inlet located on a gasifier reactor vessel.

The universal feeder system may further comprise a second chute having an open top and bottom; said top juxtaposed to the proximal end of the dual screw feeder to receive conveyed material.

The universal feeder system may further comprise the first transfer screw feeder, the second transfer screw feeder, and the third transfer screw feeder configured to connect the first transfer screw feeder to a first fuel feed inlet located on the second vessel and to connect the third transfer screw feeder to a second fuel feed inlet located on the second vessel, wherein the second vessel has a perimeter, and wherein the second fuel feed inlet location on the second vessel may be separated from the first fuel inlet location on the second vessel by a distance from one-fourth to one-half of the second vessel perimeter distance.

The universal feeder system may further comprise a feed vessel port located on the upper horizontal side of the rectangular shaped feed vessel.

The universal feeder system may further comprise a feed vessel port located on one of the three vertical sides of the rectangular shaped feed vessel.

The second vessel may be a feeder vessel.

The second vessel may be a gasifier reactor vessel.

At least one of the first transfer screw or the third transfer screw may be operably connected to the second vessel.

The present invention makes processing large volumes of feedstock in either a single- or multi-gasifier system and building large industrial facilities feasible and cost effective; replacing the current and commonly practiced use of multiple smaller units. More specifically, the present invention is universal feeder system that combines with a fluidized bed gasification reactor for the treatment of multiple diverse feedstocks including sewage sludge, municipal solid waste, wood waste, refuse derived fuels, automotive shredder residue and non-recyclable plastics. The invention thereby also illustrates a method of gasification for multiple and diverse feedstocks using a universal feeder system. The feeder system comprises one or more feed vessels and at least one live bottom dual screw feeder.

The feed vessel is rectangular shaped having three vertical sides and an angled side of no less than 60 degrees from the horizontal to facilitate proper flow of feedstock material that have different and/or variable flow properties. The feedstocks are transferred through an open bottom chute to a live bottom dual screw feeder and through another open bottom chute to a transfer screw feeder that conveys feedstock to the fuel feed inlets of a gasifier. The invention is designed for the biomass waste processing industry—standardizes the capacity scale to a single design from 10-24 tpd day to more than 40 tpd and an average of over 100 tpd of feedstock that can be used at a single facility and retain the economies of scale. It also cooperatively can work with other standard large-scale supporting equipment such as driers, pollution control equipment and thermal handling equipment. This allows for standardized system and equipment design and commoditization.

An implementation in accordance with the teaching of the present disclosure may comprise a universal feeder system that combines with a fluidized bed gasification reactor for the treatment of multiple diverse feedstocks including sewage sludge, municipal solid waste, wood waste, refuse derived fuels, automotive shredder residue and non-recyclable plastics. The invention thereby also illustrates a method of gasification for multiple and diverse feedstocks using a universal feeder system. The feeder system comprises one or more feed vessels and at least one live bottom dual screw feeder. The feed vessel is rectangular shaped having three vertical sides and an angled side of no less than 60 degrees from the horizontal to facilitate proper flow of feedstock material that have different and/or variable flow properties. The feedstocks are transferred through an open bottom chute to a live bottom dual screw feeder and through another open bottom chute to a transfer screw feeder that conveys feedstock to the fuel feed inlets of a gasifier.

In an aspect, a universal feeder system for transferring a feedstock feed in accordance with the teaching of the present disclosure may comprise: a first vessel comprising at least one rectangular shaped feed vessel having an upper horizontal side and an open lower horizontal side, three vertical sides and an angled side of no less than 60 degrees from the lower horizontal side; a motor operated variable speed live bottom dual screw feeder positioned below and parallel to the open lower horizontal side; said dual screw feeder having a proximal and distal end, wherein said dual screw feeder is operably connected to the lower horizontal side; a first chute having an open top and bottom; said top juxtaposed to the distal end of the dual screw feeder to receive conveyed material from the feedstock feed; and a first motor operated variable speed transfer screw feeder juxtaposed to the bottom of the first chute that conveys material; said first transfer screw feeder having a proximal end and a distal end, wherein the first transfer screw feeder is positioned adjacent and perpendicular to the distal end of the live bottom dual screw feeder, wherein the first transfer screw feeder distal end is configured with a flange designed to operably connect the first transfer screw feeder to a second vessel, wherein the first motor operated variable speed transfer screw feeder comprises a first feeder pipe configured with a pipe top section configured to be connected with a pipe bottom section to form the first feeder pipe, wherein the pipe top section comprises a plurality of pipe top section segments configured to be connected to form the pipe top section.

The universal feeder system may further comprise: a second transfer screw feeder juxtaposed to the bottom of the first chute that conveys material; said second transfer screw feeder having a proximal end and a distal end, wherein the second transfer screw feeder is positioned adjacent and perpendicular to the proximal end of the live bottom dual screw feeder, wherein the second transfer screw feeder distal end is configured with a flange designed to operably connect the second transfer screw feeder to the second vessel, wherein the second transfer screw feeder comprises a second feeder pipe configured with a pipe top section configured to be connected with a pipe bottom section to form the second feeder pipe, wherein the pipe top section comprises a plurality of pipe top section segments configured to be connected to form the pipe top section.

The universal feeder system may further comprise: a third transfer screw feeder having a proximal end and a distal end, wherein the third transfer screw feeder proximal end is operably connected to the second transfer screw feeder distal end, wherein the third transfer screw feeder is positioned perpendicular to the second transfer screw feeder, and wherein the third transfer screw feeder distal end is configured with a flange designed to operably connect the third transfer screw to the second vessel, wherein the third transfer screw feeder comprises a third feeder pipe configured with a pipe top section configured to be connected with a pipe bottom section to form the third feeder pipe, wherein the pipe top section comprises a plurality of pipe top section segments configured to be connected to form the pipe top section.

The feedstock feed may further comprise material selected from the group comprising sewage sludge, municipal solid waste, wood waste, refuse derived fuels, automotive shredder residue and non-recyclable plastics.

The material may be selected from the group comprising two or more feedstocks.

The second vessel may be a gasifier reactor vessel.

The second vessel may be a transfer screw feeder.

The pipe top section may be bolted to the pipe bottom section, in any or all of the first transfer screw feeder, the second transfer screw feeder, or the third transfer screw feeder.

The pipe top section may further comprise an inlet, in any or all of the first transfer screw feeder, the second transfer screw feeder, or the third transfer screw feeder.

The inlet may further comprise an inlet flange, in any or all of the first transfer screw feeder, the second transfer screw feeder, or the third transfer screw feeder.

The inlet flange may further comprise a split flange, in any or all of the first transfer screw feeder, the second transfer screw feeder, or the third transfer screw feeder.

The pipe top section may further comprise an outlet, in any or all of the first transfer screw feeder, the second transfer screw feeder, or the third transfer screw feeder.

The outlet may further comprise an outlet flange, in any or all of the first transfer screw feeder, the second transfer screw feeder, or the third transfer screw feeder.

The outlet flange may further comprise a split flange, in any or all of the first transfer screw feeder, the second transfer screw feeder, or the third transfer screw feeder.

The outlet flange may be connected to a gasifier inlet flange using a gasket, in any or all of the first transfer screw feeder, the second transfer screw feeder, or the third transfer screw feeder.

The plurality of pipe top section segments may further comprise at least two pipe top section segments, in any or all of the first transfer screw feeder, the second transfer screw feeder, or the third transfer screw feeder.

The plurality of pipe top section segments may further comprise more than two pipe top section segments, in any or all of the first transfer screw feeder, the second transfer screw feeder, or the third transfer screw feeder.

The more than two pipe top section segments may further comprise a center pipe top section segment configured to be disposed between at least two other pipe top section segments, in any or all of the first transfer screw feeder, the second transfer screw feeder, or the third transfer screw feeder.

The center pipe top section segment may be removed from the first feeder pipe, in any or all of the first transfer screw feeder, the second transfer screw feeder, or the third transfer screw feeder.

The feed screw in the first feeder pipe may be accessible when the center pipe top section segment is removed, in any or all of the first transfer screw feeder, the second transfer screw feeder, or the third transfer screw feeder.

The pipe top section may be configured to be bolted to the pipe bottom section, in any or all of the first transfer screw feeder, the second transfer screw feeder, or the third transfer screw feeder.

The pipe top section may be bolted to the pipe bottom section, in any or all of the first transfer screw feeder, the second transfer screw feeder, or the third transfer screw feeder.

The universal feeder system may further comprise a motion sensor configured to measure rotation of at least one feed screw, in any or all of the first transfer screw feeder, the second transfer screw feeder, or the third transfer screw feeder.

The universal feeder system may further comprise a motion sensor target configured to measure rotation of at least one feed screw, in any or all of the first transfer screw feeder, the second transfer screw feeder, or the third transfer screw feeder.

The second vessel may further comprise a gasifier reactor vessel further comprising a cylindrical shaped vessel having a bottom with an inverted cone section and further comprises: a freeboard section comprising a top half of the reactor vessel, said freeboard section having a diameter sized to contain gas produced from conversion of more than 40 tons of fuel per day; a fluidized bed in a bed section within said gasifier reactor vessel located beneath the freeboard section, said fluidized bed having a diameter sized to process and convert more than 40 tons of fuel into gas per day; at least two fuel feed inlets located beneath the freeboard section, said fuel inlets configured to feed a fuel into said gasifier reactor vessel at a fuel feed rate of more than 40 tons of fuel per day during steady-state operation of the gasifier reactor vessel; and a gas distributor located within the inverted cone section of the gasifier reactor vessel.

The dual live bottom screw feeder may be configured to convey material from the first vessel in two different directions and the universal feeder system further comprises the third transfer screw feeder distal end terminating in a feed nozzle, wherein the feed nozzle is mechanically connected to at least one fuel feed inlet located on a gasifier reactor vessel.

The universal feeder system may further comprise a second chute having an open top and bottom; said top juxtaposed to the proximal end of the dual screw feeder to receive conveyed material.

The universal feeder system may further comprise the first transfer screw feeder, the second transfer screw feeder, and the third transfer screw feeder are configured to connect the first transfer screw feeder to a first fuel feed inlet located on the second vessel and to connect the third transfer screw feeder to a second fuel feed inlet located on the second vessel, wherein the second vessel has a perimeter, and wherein the second fuel feed inlet location on the second vessel is separated from the first fuel inlet location on the second vessel by a distance from one-fourth to one-half of the second vessel perimeter distance.

At least one of the first transfer screw or the third transfer screw may be operably connected to the second vessel.

The plurality of pipe top section segments may be configured with at least one flange connection, in any or all of the first transfer screw feeder, the second transfer screw feeder, or the third transfer screw feeder.

While various embodiments of the present invention have been described above, it should be understood that they have been presented by way of example only, and not of limitation. Likewise, the various diagrams may depict an example architectural or other configuration for the invention, which is provided to aid in understanding the features and functionality that can be included in the invention. The invention is not restricted to the illustrated example architectures or configurations, but the desired features can be implemented using a variety of alternative architectures and configurations.

Indeed, it will be apparent to one of skill in the art how alternative functional configurations can be implemented to implement the desired features of the present invention. Additionally, with regard to operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

What is claimed is:

1. Is amended to recite:

A universal feeder system for transferring a feedstock feed comprising:
 a first open-bottom vessel configured to retain and dispense feedstock;
 a motor operated variable speed live bottom dual screw feeder positioned below and parallel to the open-bottom vessel; said dual screw feeder having a proximal and distal end, wherein said dual screw feeder is operably connected to the open-bottom vessel;
 a first chute having an open top and bottom; said top juxtaposed to the distal end of the dual screw feeder to receive conveyed material from the feedstock feed; and
 a first motor operated variable speed transfer screw feeder juxtaposed to and operably coupled with the bottom of the first chute that conveys material; said first transfer screw feeder having a proximal end and a distal end, wherein the first transfer screw feeder is positioned adjacent and perpendicular to the distal end of the live bottom dual screw feeder, wherein the first transfer screw feeder distal end is configured with a flange designed to operably connect the first transfer screw feeder to a second vessel, wherein the first transfer screw feeder is configured within a first feeder pipe comprising a proximal end, a distal end, and a pipe top section configured to detachably attach with a pipe bottom section, wherein the pipe top section comprises a plurality of pipe top section segments configured to open and close providing access to a first transfer screw,
 wherein the pipe top section segments are hinged to the pipe bottom section,
 wherein there is a handle on at least one pipe top section segment.

2. The universal feeder system of claim 1, further comprising:
 a second transfer screw feeder juxtaposed to and operably coupled with the bottom of the first chute that conveys material; said second transfer screw feeder having a proximal end and a distal end, wherein the second transfer screw feeder is positioned adjacent and perpendicular to the proximal end of the live bottom dual screw feeder, wherein the second transfer screw feeder distal end is configured with a flange designed to operably connect the second transfer screw feeder to the second vessel, wherein the second transfer screw feeder is configured within a second feeder pipe comprising a proximal end, a distal end, and a pipe top section configured to detachably attach with a pipe bottom section, wherein the pipe top section comprises a plurality of pipe top section segments configured to open and close providing access to a second transfer screw.

3. The universal feeder system of claim 2, further comprising:
a third transfer screw feeder having a proximal end and a distal end, wherein the third transfer screw feeder proximal end is operably connected to the second transfer screw feeder distal end, wherein the third transfer screw feeder is positioned perpendicular to the second transfer screw feeder, and wherein the third transfer screw feeder distal end is configured with a flange designed to operably connect the third transfer screw to the second vessel, wherein the third transfer screw feeder is configured within a third feeder pipe comprising a proximal end, a distal end, and a pipe top section configured to detachably attach with a pipe bottom section, wherein the pipe top section comprises a plurality of pipe top section segments configured to open and close providing access to a third transfer screw.

4. The universal feeder system of claim 1, wherein the feedstock feed comprises material selected from the group comprising sewage sludge, municipal solid waste, wood waste, refuse derived fuels, automotive shredder residue and non-recyclable plastics.

5. The universal feeder system of claim 4, wherein the feedstock feed comprises material selected from the group comprising two or more feedstocks.

6. The universal feeder system of claim 1, wherein the second vessel is a gasifier reactor vessel.

7. The universal feeder system of claim 1, wherein the second vessel is a transfer screw feeder.

8. The universal feeder system of claim 1, wherein the pipe top section further comprises an inlet flange operably connected to the first chute.

9. The universal feeder system of claim 1, wherein the flange designed to operably connect the first transfer screw feeder to the second vessel further comprises a first split flange.

10. The universal feeder system of claim 1, further comprising a second split flange located on the proximal end of the first feeder pipe.

11. The universal feeder system of claim 9, wherein the pipe top section further comprises an outlet operably connected to the first split flange.

12. The universal feeder system of claim 11, wherein the outlet is connected to a gasifier inlet flange using a gasket.

13. The universal feeder system of claim 1, wherein the plurality of pipe top section segments further comprises at least two pipe top section segments.

14. The universal feeder system of claim 1, wherein the plurality of pipe top section segments further comprises more than two pipe top section segments.

15. The universal feeder system of claim 14, wherein the more than two pipe top section segments further comprise a center pipe top section segment configured to be disposed between at least two other pipe top section segments.

16. The universal feeder system of claim 15, wherein the center pipe top section segment is opened.

* * * * *